United States Patent
Joshi et al.

(10) Patent No.: US 11,463,399 B2
(45) Date of Patent: Oct. 4, 2022

(54) EFFICIENT NETWORK ADDRESS TRANSLATION (NAT) IN CLOUD NETWORKS

(71) Applicant: TELEFONAKTIEBOLAGET LM ERICSSON (PUBL), Stockholm (SE)

(72) Inventors: Vinayak Joshi, Bangalore (IN); Vyshakh Krishnan C H, Bangalore (IN); Faseela K, Karnataka (IN)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 0 days.

(21) Appl. No.: 17/298,478

(22) PCT Filed: Dec. 15, 2018

(86) PCT No.: PCT/IN2018/050841
§ 371 (c)(1),
(2) Date: May 28, 2021

(87) PCT Pub. No.: WO2020/121317
PCT Pub. Date: Jun. 18, 2020

(65) Prior Publication Data
US 2022/0021646 A1 Jan. 20, 2022

(51) Int. Cl.
*H04L 61/2567* (2022.01)
*H04L 67/1001* (2022.01)
(Continued)

(52) U.S. Cl.
CPC .......... *H04L 61/2567* (2013.01); *H04L 49/70* (2013.01); *H04L 67/1001* (2022.05); *H04L 2101/618* (2022.05)

(58) Field of Classification Search
CPC . H04L 61/2567; H04L 49/70; H04L 61/6018; H04L 67/1002
(Continued)

(56) References Cited

U.S. PATENT DOCUMENTS 10,057,157 B2 * 8/2018 Goliya ..................... H04L 45/72
10,110,417 B1 * 10/2018 Hankins .................. H04L 41/04
(Continued)

FOREIGN PATENT DOCUMENTS

| CN | 103281406 A | | 9/2013 | |
|---|---|---|---|---|
| CN | 113328934 A | * | 8/2021 | ......... H04L 12/4633 |

(Continued)

OTHER PUBLICATIONS

P. Marques, et al., "Dissemination of Flow Specification Rules", Network Working Group, Request for Comments: 5575, Aug. 2009, pp. 1-22.
(Continued)

*Primary Examiner* — Melvin H Pollack
(74) *Attorney, Agent, or Firm* — Christopher & Weisberg, P.A.

(57) ABSTRACT

A method is implemented by a network device for enabling destination network address translation in a cloud network. The method includes determining that packets having a first public address as a source address and a second public address as a destination address are to be forwarded to a first host that is assigned a first private address and sending a first advertisement message to a gateway indicating that packets having the first public address as a source address and the second public address as a destination address are to be forwarded to a first switch connected to the first host, where the first switch is configured to translate the destination address of those packets from the second public address to the first private address assigned to the first host.

15 Claims, 12 Drawing Sheets

(51) Int. Cl.
  *H04L 49/00* (2022.01)
  *H04L 101/618* (2022.01)
(58) Field of Classification Search
  USPC .......................................................... 709/245
  See application file for complete search history.

(56) References Cited

U.S. PATENT DOCUMENTS

| | | | | |
|---|---|---|---|---|
| 10,177,957 | B1* | 1/2019 | Hankins | H04L 63/0272 |
| 10,178,032 | B1* | 1/2019 | Freitas | H04L 45/24 |
| 10,200,511 | B2* | 2/2019 | Chen | H04L 45/741 |
| 10,355,989 | B1* | 7/2019 | Panchal | H04L 67/10 |
| 10,389,608 | B2* | 8/2019 | Searle | H04L 43/0864 |
| 10,498,810 | B2* | 12/2019 | Hood | H04L 12/4641 |
| 10,693,715 | B1* | 6/2020 | Strauss | H04L 61/1511 |
| 10,725,885 | B1* | 7/2020 | Paraschiv | G06F 11/3433 |
| 10,749,808 | B1* | 8/2020 | MacCarthaigh | H04L 47/19 |
| 10,826,723 | B1* | 11/2020 | Strauss | G06F 9/45558 |
| 10,880,162 | B1* | 12/2020 | Hankins | H04L 41/0813 |
| 10,880,264 | B1* | 12/2020 | Chakravarthy Dandangi | H04L 61/251 |
| 11,196,591 | B2* | 12/2021 | Hira | H04L 12/66 |
| 2013/0238802 | A1* | 9/2013 | Sarikaya | G06F 9/45558 709/226 |
| 2014/0086253 | A1* | 3/2014 | Yong | H04L 49/70 370/395.53 |
| 2015/0381493 | A1* | 12/2015 | Bansal | H04L 45/38 370/392 |
| 2018/0063743 | A1* | 3/2018 | Tumuluru | G06F 9/5077 |
| 2018/0077111 | A1* | 3/2018 | Pang | H04L 61/2038 |
| 2018/0139272 | A1 | 5/2018 | Puri et al. | |
| 2018/0191666 | A1* | 7/2018 | Rahman | H04L 61/1511 |
| 2018/0234333 | A1* | 8/2018 | Inamdar | H04L 45/24 |
| 2018/0234471 | A1* | 8/2018 | Qian | H04L 65/403 |
| 2018/0302243 | A1* | 10/2018 | Li | H04L 45/50 |
| 2019/0052558 | A1* | 2/2019 | Mehta | H04L 45/64 |
| 2019/0280948 | A1* | 9/2019 | Abley | H04L 43/04 |
| 2020/0007495 | A1* | 1/2020 | Balamurugan | H04L 45/64 |
| 2020/0099659 | A1* | 3/2020 | Cometto | H04L 63/101 |
| 2020/0136917 | A1* | 4/2020 | Kang | H04L 61/2571 |
| 2021/0144084 | A1* | 5/2021 | Dubey | H04L 45/566 |
| 2021/0273827 | A1* | 9/2021 | Vairavakkalai | H04L 12/4641 |

FOREIGN PATENT DOCUMENTS

| | | |
|---|---|---|
| CN | 113472622 A * | 10/2021 |
| WO | 2014101501 A1 | 7/2014 |
| WO | WO-2021155389 A2 * | 8/2021 |

OTHER PUBLICATIONS

EPO Communication with Supplementary European Search Report dated Jun. 15, 2022 for Patent Application No. 18943222.2, consisting of 10-pages.
Tero Marttila; Design and Implementation of the clusterf Load Balancer for Docket Clusters; AALTO University School of Electrical Engineering/ Master Thesis; Oct. 10, 2016, consisting of 104-pages.
Parveen Patel et al.; Ananta: Cloud Scale Load Balancing; Sigcomm' 13; Aug. 27, 2013, Hong Kong, China, consisting of 12-pages.

* cited by examiner

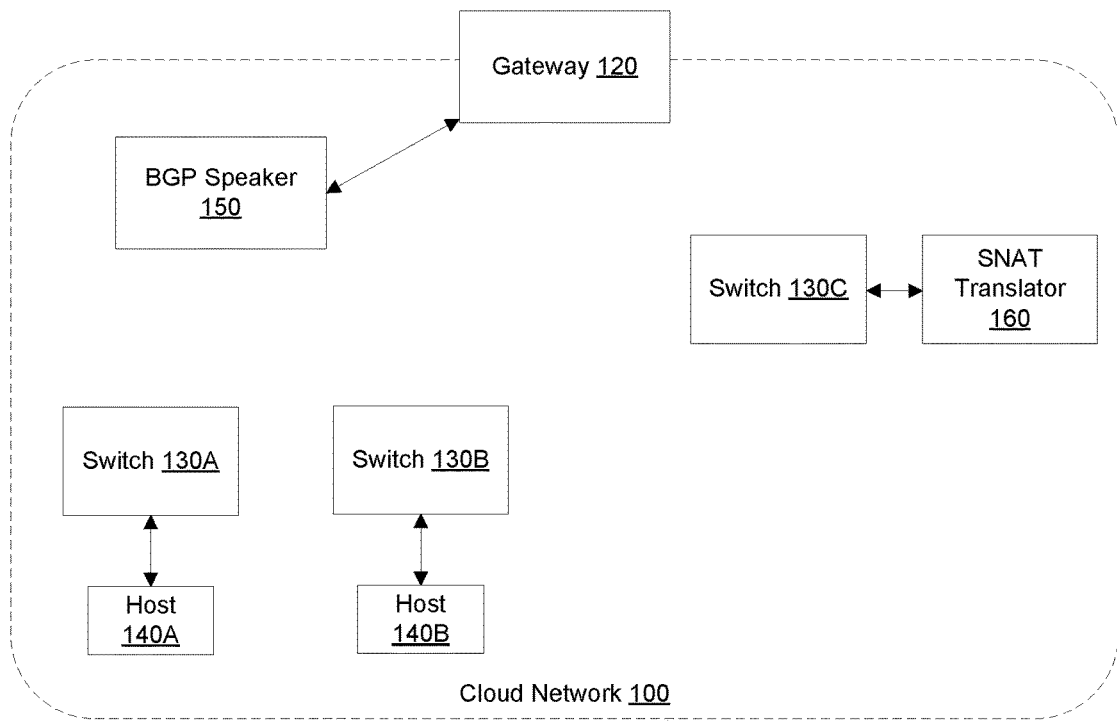
Centralized SNAT
Private Domain to Public Domain
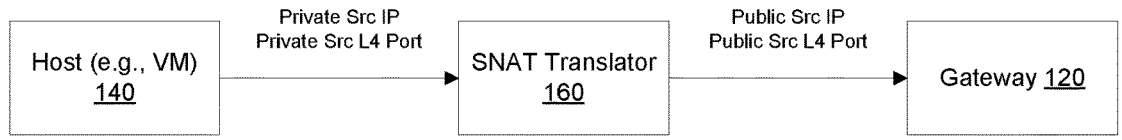
Public Domain to Private Domain
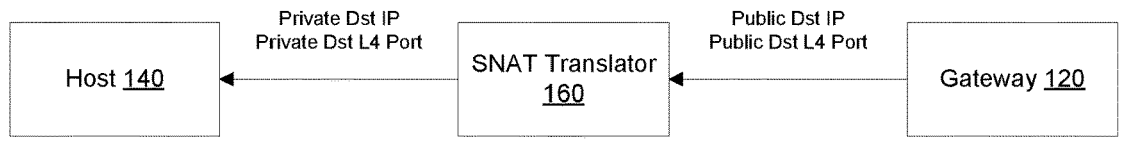
Distributed Inline SNAT
Private Domain to Public Domain
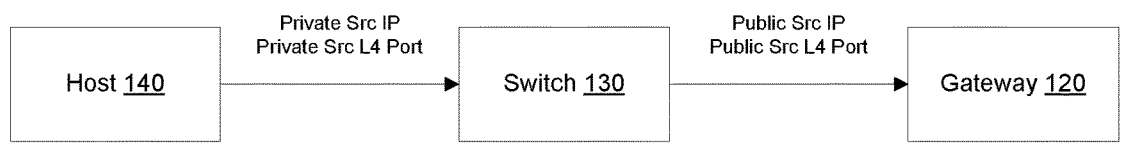
Public Domain to Private Domain
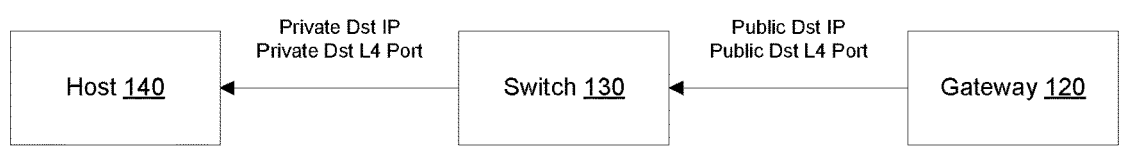
Fig. 1 (PRIOR ART)

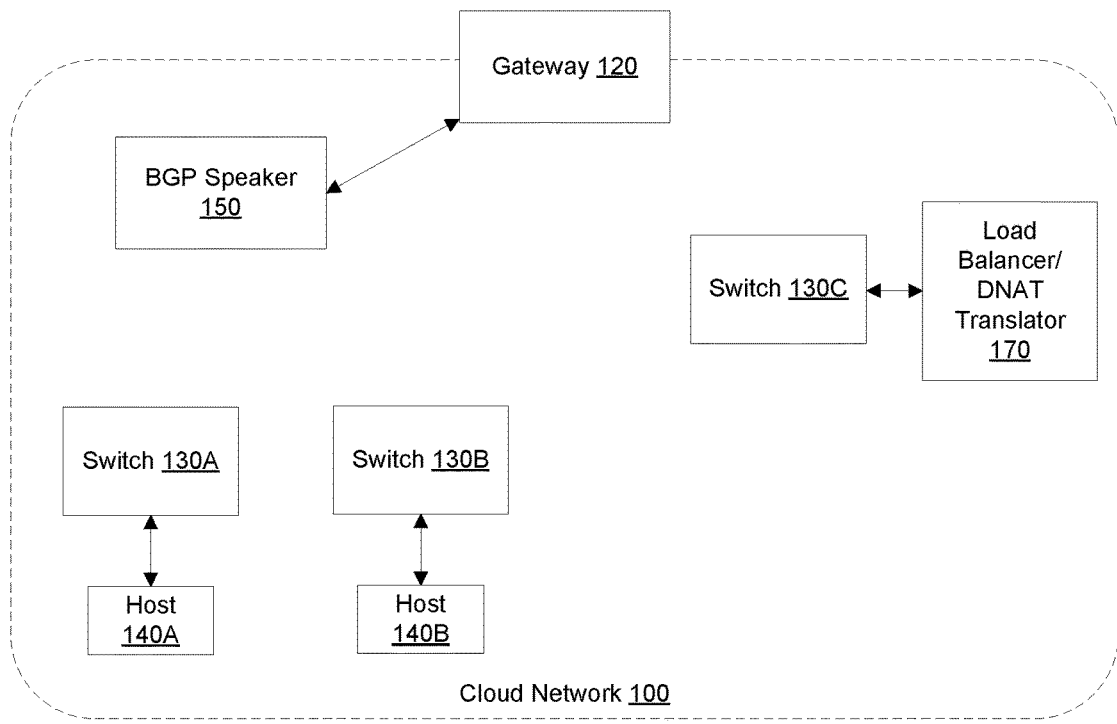
Centralized DNAT
Public Domain to Public Domain
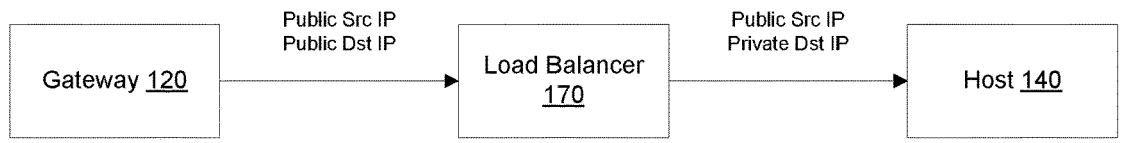
Private Domain to Public Domain
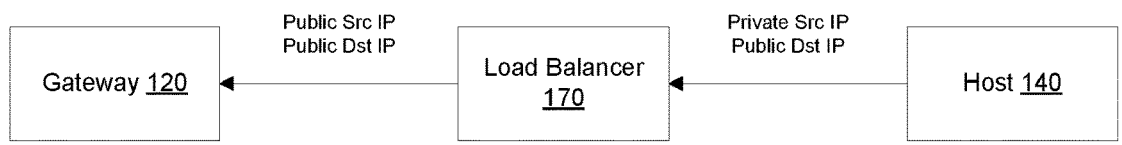
Distributed Inline DNAT
Public Domain to Public Domain
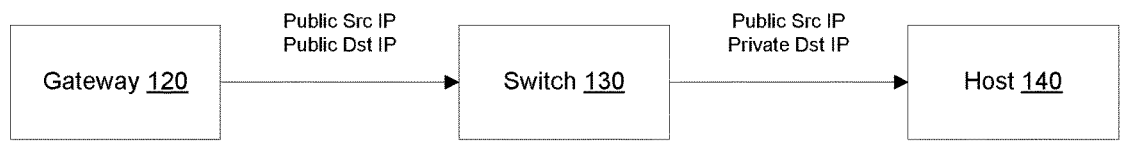
Private Domain to Public Domain
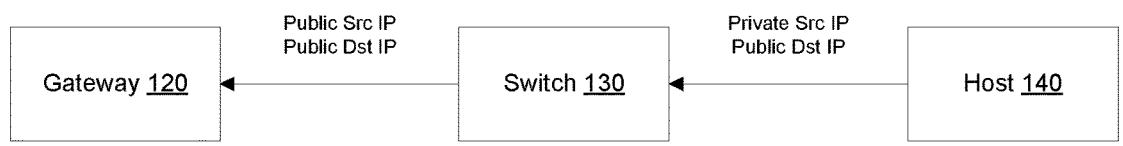
Fig. 2 (PRIOR ART)

```
+------------------------------------------------------+
| Address Family Identifier (2 octets)         = 1     |
+------------------------------------------------------+
| Subsequent Address Family Identifier (1 octet) = 134 |
+------------------------------------------------------+
| Length of Next Hop Network Address (1 octet)  = 4    |
+------------------------------------------------------+
| Network Address of Next Hop (variable)     = TEP-1 IP|
+------------------------------------------------------+
| Reserved (1 octet)                                   |
+------------------------------------------------------+
| Network Layer Reachability Information (variable)    |
+------------------------------------------------------+
```

NLRI:
```
+--------------------------+-------------+----------------+
| destination              | proto       | port           |
+--------------------------+-------------+----------------+
| 0x01 20 ac 01 01 01      | 03 81 06    | 05 81 1b58     |
+--------------------------+-------------+----------------+
```

Decode for destination:
```
+-----------------+-----------+--------------------------------+
| Value           |           |                                |
+-----------------+-----------+--------------------------------+
| 0x01            | type      | type for destination-prefix    |
| 0x20            | prfx-len  | 32                             |
| 0xac 01 01 01   | value     | 172.1.1.1                      |
+-----------------+-----------+--------------------------------+
```

Decode for proto:
```
+--------+----------+-------------------------------------+
| Value  |          |                                     |
+--------+----------+-------------------------------------+
| 0x03   | type     | type for protocol                   |
| 0x81   | operator | end-of-list, value size=1, =        |
| 0x06   | value    | TCP protocol value                  |
+--------+----------+-------------------------------------+
```

Decode for port:
```
+---------+----------+-------------------------------------+
| Value   |          |                                     |
+---------+----------+-------------------------------------+
| 0x05    | type     | type for destination-port           |
| 0x81    | operator | end-of-list, value size=1, =        |
| 0x1b58  | value    | port = 7000                         |
+---------+----------+-------------------------------------+
```

Fig. 4

```
+--------------------------------------------------------+
| Address Family Identifier (2 octets)        = 1        |
+--------------------------------------------------------+
| Subsequent Address Family Identifier (1 octet) = 134   |
+--------------------------------------------------------+
| Length of Next Hop Network Address (1 octet)   = 4     |
+--------------------------------------------------------+
| Network Address of Next Hop (variable)      = TEP-2 IP |
+--------------------------------------------------------+
| Reserved (1 octet)                                     |
+--------------------------------------------------------+
| Network Layer Reachability Information (variable)      |
+--------------------------------------------------------+
```

NLRI:
```
+-------------------------------+-------------------------+
| destination                   | source                  |
+-------------------------------+-------------------------+
| 0x01 20 ac 01 01 01           | 0x02 20 40 01 01 01     |
+-------------------------------+-------------------------+
```

Decode for destination:
```
+----------------+-----------+-------------------------------+
| Value          |           |                               |
+----------------+-----------+-------------------------------+
| 0x01           | type      | type for destination-prefix   |
| 0x20           | prfx-len  | 32                            |
| 0xac 01 01 01  | value     | 172.1.1.1                     |
+----------------+-----------+-------------------------------+
```

Decode for source:
```
+----------------+-----------+-------------------------------+
| Value          |           |                               |
+----------------+-----------+-------------------------------+
| 0x02           | type      | type for source-prefix        |
| 0x20           | prfx-len  | 32                            |
| 0x40 01 01 01  | value     | 64.1.1.1                      |
+----------------+-----------+-------------------------------+
```

Fig. 6

EFFICIENT NETWORK ADDRESS TRANSLATION (NAT) IN CLOUD NETWORKS

This application is a national stage of International Application No. PCT/IN2018/050841, filed Dec. 15, 2018, the entire disclosure of which is fully incorporated herein by reference.

TECHNICAL FIELD

Embodiments of the invention relate to the field of computer networks, and more specifically, to enabling efficient network address translation in cloud networks.

BACKGROUND ART

Network address translation (NAT) is a technique whereby network addresses (e.g., Internet Protocol (IP) address) in packets are modified while they are in transit. In general, NAT is performed in such a way that is transparent to the sender and receiver of the packets. There are several variations of NAT including source network address translation (SNAT) and destination network address translation (DNAT).

SNAT is a type of NAT that modifies the source addresses of packets. SNAT is commonly used for Internet Protocol version 4 (IPv4) address conservation purposes. Network Address Port Translation (NAPT) is the most popular type of SNAT. With NAPT, when a Transmission Control Protocol (TCP) or User Datagram Protocol (UDP) packet originating in an internal (private) domain travels to an external (public) domain, a NAPT translator translates the private source Internet Protocol (IP) address and private source port of the packet to a public source IP address and public source port, respectively. Since multiple private source IP addresses can map to a smaller set of public source IP addresses, the number of IP addresses used in the public domain can be conserved. Each mapping can be considered a NAPT session and is maintained by the NAPT translator. Packets traveling in the reverse direction pass through the same NAPT translator that performed the NAT in the forward direction (or another translator that is aware of the NAPT session) so that the correct translation can be performed in the reverse direction. In the reverse direction, when a packet travels from the public domain to the private domain, the NAPT translator translates the public destination IP address and the public destination port of the packet to the corresponding private IP address and private port, respectively.

DNAT is a type of NAT that modifies the destination addresses of packets. DNAT is commonly used for load balancing traffic from multiple hosts (e.g., subscribers) in the public domain amongst different servers providing the same service (e.g., a news service) in the private domain. For example, when a packet originated by a first host (in the public domain) travels from the public domain to the private domain, a DNAT translator translates the public destination IP address of the packet to a private destination IP address corresponding to one of the different servers (in the private domain) providing the same service. When a packet originated by a second host travels from the public domain to the private domain, the DNAT translator may translate the public destination IP address of that packet to a private destination IP address corresponding to a different one of the servers for load balancing purposes. The DNAT translator can translate the source IP address of return packets back to the public IP address. The challenge with DNAT is that flow stickiness has to be maintained (e.g., all packets belonging to the TCP session between a particular host and a particular server should always be sent to that same particular server). Maintaining this mapping itself can become a bottleneck.

In cloud networks, SNAT is typically used when a Layer 4 (L4) flow is originated from a cloud workload and destined for the public domain (e.g., a virtual machine (VM) initiating a TCP connection as a client to a public domain web server). DNAT is typically used in cloud networks where services (e.g., Hypertext Transfer Protocol (HTTP) services) are hosted in the cloud network using private addresses and the service entry points are reachable via public addresses (e.g., this is often the case with websites that have high traffic loads).

Border Gateway Protocol (BGP) based connectivity has become popular for supporting tenant networking in cloud networks. Multi-Protocol Border Gateway Protocol (MP-BGP) extensions such as BGP Virtual Private Network (BGP-VPN) and BGP Ethernet Virtual Private Network (BGP-EVPN) are commonly deployed in cloud networks where one or more BGP speakers in the cloud network establish BGP peer connectivity with gateways.

BGP routing in cloud networks should be aware of NAT aspects. For example, public addresses should be advertised to the public domain while restricting private address advertisements to the private domain. Also, any routing should direct and process traffic such that the statefulness property is not violated for traffic in the two directions. NAT (e.g., SNAT and/or DNAT) can be performed in the cloud network using a centralized model or a distributed model. In the centralized model, all traffic that needs to be translated is directed to a NAT appliance or a designated switch that is configured to perform NAT before being sent to its destination. However, this requires that traffic travel an extra leaf-to-leaf hop in the cloud network. Such crisscrossing of traffic within the cloud network increases congestion, especially in the case of Network Function Virtualization Infrastructure (NFVi) deployments where high throughput packet forwarding is involved. In the distributed model, instead of having a centralized NAT appliance, multiple nodes (e.g., switches) in the cloud network are configured to perform inline NAT. BGP routes can be advertised to the gateway (e.g., a datacenter gateway) to attract the ingress traffic to the correct nodes for translation. However, this solution requires having at least one public address per node to be able to enable the gateway to direct the traffic to the correct node.

SUMMARY

A method implemented by a network device for enabling destination network address translation in a cloud network. The method includes determining that packets having a first public address as a source address and a second public address as a destination address are to be forwarded to a first host that is assigned a first private address and sending a first advertisement message to a gateway indicating that packets having the first public address as a source address and the second public address as a destination address are to be forwarded to a first switch connected to the first host, where the first switch is configured to translate the destination address of those packets from the second public address to the first private address assigned to the first host.

A method implemented by a network device for enabling source network address translation in a cloud network. The method includes determining that packets having a first public address as a destination address and a first public port as a destination port are to be forwarded to a first host that is assigned a first private address and sending a first advertisement message to a gateway indicating that packets having the first public address as a destination address and the first public port as a destination port are to be forwarded to a first switch connected to the first host, where the first switch is configured to translate the destination address of those packets from the first public address to the first private address assigned to the first host and to translate the destination port of those packets from the first public port to a first private port.

A network device for enabling destination network address translation in a cloud network. The network device includes a set of one or more processors and a non-transitory computer-readable storage medium to store instructions, which when executed by the set of one or more processors, causes the network device to determine that packets having a first public address as a source address and a second public address as a destination address are to be forwarded to a first host that is assigned a first private address and send an advertisement message to a gateway indicating that packets having the first public address as a source address and the second public address as a destination address are to be forwarded to a first switch connected to the first host, where the first switch is configured to translate the destination address of those packets from the second public address to the first private address assigned to the first host.

A network device for enabling source network address translation in a cloud network. The network device includes a set of one or more processors and a non-transitory computer-readable storage medium to store instructions, which when executed by the set of one or more processors, causes the network device to determining that packets having a first public address as a destination address and a first public port as a destination port are to be forwarded to a first host that is assigned a first private address and send an advertisement message to a gateway indicating that packets having the first public address as a destination address and the first public port as a destination port are to be forwarded to a first switch connected to the first host, where the first switch is configured to translate the destination address of those packets from the first public address to the first private address assigned to the first host and to translate the destination port of those packets from the first public port to a first private port.

A non-transitory computer-readable storage medium storing instructions (e.g., computer code), which when executed by one or more processors of a network device, cause the network device to perform operations for enabling destination network address translation in a cloud network. The operations include determining that packets having a first public address as a destination address and a first public port as a destination port are to be forwarded to a first host that is assigned a first private address and sending a first advertisement message to a gateway indicating that packets having the first public address as a destination address and the first public port as a destination port are to be forwarded to a first switch connected to the first host, where the first switch is configured to translate the destination address of those packets from the first public address to the first private address assigned to the first host and to translate the destination port of those packets from the first public port to a first private port.

A non-transitory computer-readable storage medium storing instructions (e.g., computer code), which when executed by one or more processors of a network device, cause the network device to perform operations for enabling source network address translation in a cloud network. The operations include determining that packets having a first public address as a destination address and a first public port as a destination port are to be forwarded to a first host that is assigned a first private address and sending a first advertisement message to a gateway indicating that packets having the first public address as a destination address and the first public port as a destination port are to be forwarded to a first switch connected to the first host, where the first switch is configured to translate the destination address of those packets from the first public address to the first private address assigned to the first host and to translate the destination port of those packets from the first public port to a first private port.

BRIEF DESCRIPTION OF THE DRAWINGS

The invention may best be understood by referring to the following description and accompanying drawings that are used to illustrate embodiments of the invention. In the drawings:

FIG. 1 is a block diagram illustrating a centralized source network address translation (SNAT) model and a distributed inline SNAT model in a cloud network.

FIG. 2 is a block diagram illustrating a centralized destination network address translation (DNAT) model and a distributed inline DNAT model in a cloud network.

FIG. 4 is a diagram illustrating an exemplary Border Gateway Protocol (BGP) Flow Specification message for enabling efficient SNAT, according to some embodiments.

FIG. 6 is a diagram illustrating an exemplary BGP Flow Specification message for enabling efficient DNAT, according to some embodiments.

DETAILED DESCRIPTION

Figure 3A:
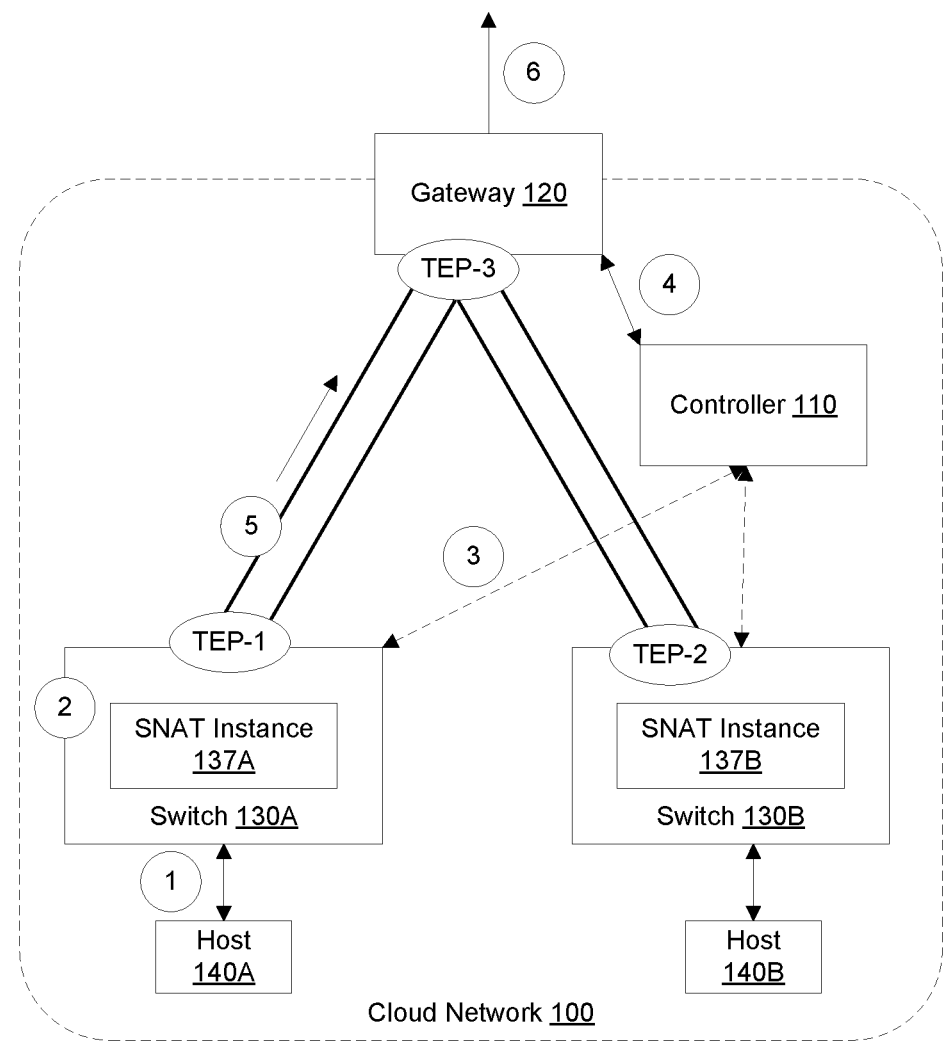
FIG. 3A is a block diagram illustrating efficient SNAT in the egress direction in a cloud network, according to some embodiments.

The following description describes methods and apparatus for enabling efficient network address translation in cloud networks. In the following description, numerous specific details such as logic implementations, opcodes, means to specify operands, resource partitioning/sharing/duplication implementations, types and interrelationships of system components, and logic partitioning/integration choices are set forth in order to provide a more thorough understanding of the present invention. It will be appreciated, however, by one skilled in the art that the invention may be practiced without such specific details. In other instances, control structures, gate level circuits and full software instruction sequences have not been shown in detail in order not to obscure the invention. Those of ordinary skill in the art, with the included descriptions, will be able to implement appropriate functionality without undue experimentation.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

Bracketed text and blocks with dashed borders (e.g., large dashes, small dashes, dot-dash, and dots) may be used herein to illustrate optional operations that add additional features to embodiments. However, such notation should not be taken to mean that these are the only options or optional operations, and/or that blocks with solid borders are not optional in certain embodiments.

In the following description and claims, the terms "coupled" and "connected," along with their derivatives, may be used. It should be understood that these terms are not intended as synonyms for each other. "Coupled" is used to indicate that two or more elements, which may or may not be in direct physical or electrical contact with each other, co-operate or interact with each other. "Connected" is used to indicate the establishment of communication between two or more elements that are coupled with each other.

An electronic device stores and transmits (internally and/or with other electronic devices over a network) code (which is composed of software instructions and which is sometimes referred to as computer program code or a computer program) and/or data using machine-readable media (also called computer-readable media), such as machine-readable storage media (e.g., magnetic disks, optical disks, solid state drives, read only memory (ROM), flash memory devices, phase change memory) and machine-readable transmission media (also called a carrier) (e.g., electrical, optical, radio, acoustical or other form of propagated signals—such as carrier waves, infrared signals). Thus, an electronic device (e.g., a computer) includes hardware and software, such as a set of one or more processors (e.g., wherein a processor is a microprocessor, controller, microcontroller, central processing unit, digital signal processor, application specific integrated circuit, field programmable gate array, other electronic circuitry, a combination of one or more of the preceding) coupled to one or more machine-readable storage media to store code for execution on the set of processors and/or to store data. For instance, an electronic device may include non-volatile memory containing the code since the non-volatile memory can persist code/data even when the electronic device is turned off (when power is removed), and while the electronic device is turned on that part of the code that is to be executed by the processor(s) of that electronic device is typically copied from the slower non-volatile memory into volatile memory (e.g., dynamic random access memory (DRAM), static random access memory (SRAM)) of that electronic device. Typical electronic devices also include a set or one or more physical network interface(s) (NI(s)) to establish network connections (to transmit and/or receive code and/or data using propagating signals) with other electronic devices. For example, the set of physical NIs (or the set of physical NI(s) in combination with the set of processors executing code) may perform any formatting, coding, or translating to allow the electronic device to send and receive data whether over a wired and/or a wireless connection. In some embodiments, a physical NI may comprise radio circuitry capable of receiving data from other electronic devices over a wireless connection and/or sending data out to other devices via a wireless connection. This radio circuitry may include transmitter(s), receiver(s), and/or transceiver(s) suitable for radiofrequency communication. The radio circuitry may convert digital data into a radio signal having the appropriate parameters (e.g., frequency, timing, channel, bandwidth, etc.). The radio signal may then be transmitted via antennas to the appropriate recipient(s). In some embodiments, the set of physical NI(s) may comprise network interface controller(s) (NICs), also known as a network interface card, network adapter, or local area network (LAN) adapter. The NIC(s) may facilitate in connecting the electronic device to other electronic devices allowing them to communicate via wire through plugging in a cable to a physical port connected to a NIC. One or more parts of an embodiment may be implemented using different combinations of software, firmware, and/or hardware.

A network device (ND) is an electronic device that communicatively interconnects other electronic devices on the network (e.g., other network devices, end-user devices). Some network devices are "multiple services network devices" that provide support for multiple networking functions (e.g., routing, bridging, switching, Layer 2 aggregation, session border control, Quality of Service, and/or subscriber management), and/or provide support for multiple application services (e.g., data, voice, and video).

As mentioned above, source network address translation (SNAT) and/or destination network address translation (DNAT) can be performed in cloud networks using a centralized model or a distributed inline model. FIG. 1 is a block diagram illustrating a centralized SNAT model and a distributed inline SNAT model. The diagram shows a cloud network 100 that includes a gateway 120, a Border Gateway Protocol (BGP) speaker 150, switches 130A-C, hosts 140A and 140B, and an SNAT translator 160. Host 140A is communicatively coupled to switch 130A and host 140B is communicatively coupled to switch 130B. The BGP speaker 150 is communicatively coupled to the gateway 120. The SNAT translator 160 is communicatively coupled to switch 130C. The SNAT translator 160 may be implemented by a dedicated NAT appliance (e.g., a virtual machine (VM)) or by specifically designated switches. The various components in the cloud network 100 may be communicatively coupled with each other via switches 130 and thus may communicate with each other via switches 130.

In the centralized SNAT model, traffic between a host 140 and the public domain (e.g., a network external to the cloud network 100) and sometimes traffic between hosts 140 within the cloud network 100 (e.g., in the case that the hosts 140 are in different domains) go through the SNAT translator 160 before being sent to their destinations. For example, as shown in the diagram, for traffic going from the private domain (e.g., the cloud network 100) to the public domain (e.g., an external network), host 140 (which may be a VM) may send a packet having a private source IP address and a private source Layer 4 (L4) port to the SNAT translator 160. The SNAT translator 160 translates (e.g., modifies) the private source IP address and private source L4 port of the packet to a public source IP address and public source L4 port, respectively, and sends the translated packet to the gateway 120. The gateway 120 can then send this packet into the public domain (outside of the cloud network 100). Traffic can be directed/steered to the SNAT translator 160 in various ways. For example, a Software Defined Networking (SDN) controller (not shown) in the cloud network 100 may program switches 130 (e.g., using a southbound protocol such as OpenFlow) to direct traffic destined for the public domain to the SNAT translator 160 for translation before the traffic enters the public domain. Another option is to designate the SNAT translator 160 as a default gateway. Yet another option is to use service chaining. As used herein, private addresses/ports are addresses/ports that are private to the private domain (e.g., the cloud network 100), whereas public addresses/ports are addresses/ports that are public (e.g., globally unique address/port that can be used for routing in the public domain (e.g., the internet)).

For traffic going from the public domain to the private domain, the gateway 120 may receive a packet (e.g., a response packet from the public domain) having a public destination IP address and a public destination L4 port. The gateway 120 sends this packet to the SNAT translator 160. The SNAT translator 160 translates the public destination IP address and public destination L4 port of the packet to a private destination IP address and private destination L4 port, respectively, and sends the translated packet to host 140. The ingress point (the gateway 120 in this example) may not be under the control of an SDN controller. In cloud networks that use BGP, BGP routes may be announced to the gateway 120 using a routing protocol running inside the cloud network 100 to direct ingress packets to the SNAT translator 160. Multiprotocol BGP (MP-BGP) is often used for this purpose as it provides multi-tenant aware routing. For example, the BGP speaker 150 may announce BGP routes to the gateway 120 and these routes would advertise all/32 prefixes of public IP addresses with the SNAT translator 160 as the next-hop. This allows traffic entering the cloud network 100 with a public destination IP address to be (reverse) translated by the SNAT translator 160. Typically, multiple instances of the SNAT translator 160 are deployed to provide redundancy and load balancing.

Another way to implement the centralized SNAT model is to have a designated switch perform SNAT translations. For example, the first packet belonging to a new flow originating from a host 140 is first punted to the SDN controller. The SDN controller chooses the source port to be used and programs the designated switch (e.g., using a southbound protocol such as OpenFlow) to perform SNAT translation in both the ingress and egress directions. The gateway 120 may then redirect traffic coming from the public domain to the designated switch at which the SNAT translation can be performed. The translated packet may then be sent to the host 140.

In the distributed inline SNAT model, multiple nodes (e.g., switches) in the cloud network 100 are configured to perform inline NAT. For example, as shown in the diagram, for traffic going from the private domain to the public domain, host 140 may send a packet having a private source IP address and a private source Layer 4 (L4) port to switch 130. Since switch 130 is configured to perform SNAT, it can translate the private source IP address and private source L4 port of the packet to a public source IP address and public source L4 port, respectively, and send the packet to the gateway 120. The gateway 120 can then send the translated packet to the public domain. In this manner, the translation is performed inline at switch 130 itself.

For traffic going from the public domain to the private domain, the gateway 120 may receive a packet (e.g., a response packet from the public domain) having a public destination IP address and public destination L4 port. The gateway 120 sends this packet to switch 130. Since switch 130 is configured to perform SNAT, it can translate the public destination IP address and public destination L4 port to a private destination IP address and private destination L4 port, respectively, and send the translated packet to host 140. In cloud networks that use BGP, BGP routes may be announced to the gateway 120 using a routing protocol running inside the cloud network 100 to direct ingress packets to the appropriate switch 130 for translation. BGP speaker 150 may announce BGP routes to the gateway 120 and these routes would advertise all/32 prefixes of public IP addresses, as done with centralized SNAT. However, this solution requires at least one public IP address per node (e.g., switch 130) to allow gateway 120 to be able to direct traffic to the correct node. Thus, tenant public IP addresses are mapped to specific nodes. Thus, if two hosts 140 running on different nodes (e.g., different physical hardware) wish to initiate communication with the public domain, they cannot use the same public IP address.

FIG. 2 is a block diagram illustrating a centralized DNAT model and a distributed inline DNAT model. The diagram shows a cloud network 100 that includes a gateway 120, a BGP speaker 150, switches 130A-C, hosts 140A and 140B, and a load balancer/DNAT translator 170. Host 140A is communicatively coupled to switch 130A and host 140B is communicatively coupled to switch 130B. The BGP speaker 150 is communicatively coupled to the gateway 120. The load balancer/DNAT translator 170 is communicatively coupled to switch 130C. The load balancer/DNAT translator 170 may be implemented by a dedicated NAT appliance (e.g., a virtual machine (VM)) or by specifically designated switches. The various components in the cloud network 100 may be communicatively coupled with each other via switches 130 and thus may communicate with each other via switches 130. In this example, hosts 140A and 140B host the same service/application (e.g., a web server) and use the same public IP address.

In the centralized DNAT model, traffic entering the private domain from the public domain is directed to the load balancer/DNAT translator 170. The load balancer/DNAT translator 170 then distributes traffic to different ones of the hosts 140A and 140B (e.g., using a load balancing algorithm) by translating the public destination IP address of packets to the private destination IP address corresponding to the chosen host 140. For example, as shown in the diagram, for traffic going from the public domain to the private domain, the gateway 120 may receive a packet (from the public domain) having a public source IP address and public destination IP address. The gateway 120 sends this packet to the load balancer 170. The load balancer 170 translates the public destination IP address of the packet to a private destination IP address (e.g., according to a load balancing decision) and sends the translated packet to host 140. In cloud networks that use BGP, BGP routes may be announced to the gateway 120 using a routing protocol running inside the cloud network 100 to direct ingress traffic to the load balancer 170. For example, the BGP speaker 150 may announce BGP routes to the gateway 120 and these routes would advertise all/32 prefixes of public IP addresses with the load balancer 170 as the next-hop to allow traffic entering the cloud network 100 to be load balanced.

For traffic going from the private domain to the public domain, host 140 may send a packet (e.g., a response packet) to the load balancer 170 having a private source IP address and public destination IP address. The load balancer 170 translates the private source IP address of the packet to a public source IP address and sends the translated packet to the gateway 120. The gateway 120 can then send this packet to the public domain. Traffic can be directed/steered to the load balancer 170 by programming switches 130 (e.g., an SDN controller may program the switches 130 using a southbound protocol such as OpenFlow) to direct traffic destined for the public domain to the load balancer 170.

Another way to implement the centralized DNAT model is to have a designated switch perform DNAT translations. For example, the first packet belonging to a new flow originating from an external host (in the public domain) and entering the cloud network 100 is first punted to the SDN controller. The SDN controller makes the load balancing decision (e.g., using a load balancing algorithm) by choosing one of the hosts 140 to handle the flow and programs the designated switch (e.g., using a southbound protocol such as OpenFlow) to perform DNAT translation in both the ingress and egress directions. The gateway 120 can then redirect traffic coming from the public domain to the designated switch at which the DNAT translation can be performed. The translated packet may then be sent to the chosen host 140.

In the distributed inline DNAT model, multiple nodes (e.g., switches) in the cloud network 100 are configured to perform inline DNAT. For example, as shown in the diagram, for traffic going from the public domain to the private domain, the gateway 120 may receive a packet (from the public domain) having a public source IP address and public destination IP address. The gateway 120 sends this packet to switch 130. Since switch 130 is configured to perform DNAT, it can translate the public destination IP address of the packet to a private destination IP address and send the translated packet to host 140. In cloud networks that use BGP, BGP routes may be announced to the gateway 120 using a routing protocol running inside the cloud network 100 to direct ingress packets to the appropriate switch 130 for translation. The BGP speaker 150 may announce BGP routes to the gateway 120 and these routes would advertise all/32 prefixes of public IP addresses, as done with centralized SNAT. However, this solution requires at least one public IP address per node (e.g., switch 130) to allow gateway 120 to be able to direct traffic to the correct node. That is, public IP addresses are tied to nodes. Thus, two hosts 140 providing the same service but running on different nodes (e.g., different physical hardware) cannot use the same public IP address.

For traffic going from the private domain to the public domain, host 140 may send a packet (e.g., a response packet) to switch 130 having a private source IP address and public destination IP address. Switch 130 translates the private source IP address of the packet to a public source IP address and sends the translated packet to the gateway 120. The gateway 120 can then send this packet to the public domain.

A disadvantage of the centralized NAT model (for both SNAT and DNAT) is that it increases packet latency since packets have to travel an additional leaf-to-leaf hop in the cloud network. Such crisscrossing of traffic within the cloud network increases congestion, especially in the case of Network Function Virtualization Infrastructure (NFVi) deployments where high throughput packet forwarding is involved. Also, when there are multiple instances of the NAT appliance (e.g., for redundancy purposes), state synchronization between them can be challenging.

While the distributed inline NAT model avoids the additional hop in the cloud network, it requires that public IP addresses are tied to nodes. This requires more public IP addresses than the centralized NAT model and can be a burden to manage. Also, for live migration of VMs across nodes, the public source IP address of all Transmission Control Protocol (TCP)/User Datagram Protocol (UDP) flows should be retained to avoid disruption. However, since public IP addresses are tied to specific nodes, live VM migration is difficult to accomplish.

Embodiments described herein overcome some of the disadvantages of the existing NAT models described above by providing an efficient NAT model that avoids the additional hop in the cloud network without requiring that public addresses be tied to specific nodes. Embodiments recognize that when traffic enters the cloud network 100 from the public domain, performing a regular longest prefix match (e.g., /32 prefix match) on the destination addresses of packets is not sufficient to direct the packets to the correct node in the cloud network 100 for translation. Thus, embodiments may match additional fields of the packets to direct the packets to the correct node for translation. For example, for SNAT, the gateway 120 may match both the destination address and the destination port (e.g., L4 port) of the packet to determine the next-hop. For DNAT, the gateway 120 may match the source address (and source port in some cases) and the destination address of the packet to determine the next-hop.

Some embodiments may use BGP Flow Specification (Flowspec) to help the gateway 120 match various fields of packets. For example, the BGP speaker 150 in the cloud network 100 may use BGP Flowspec to advertise routes to the gateway 120 for a given source address, destination address, source port, and/or destination port, where the next-hop identifies the SNAT/DNAT instance that is to perform the translation. The BGP speaker 150 may advertise the route to the gateway 120 whenever a new SNAT/DNAT session is created so that the gateway 120 is made aware of the SNAT/DNAT instances that are to perform translations for different packets. For example, Network Layer Reachability Information (NLRI) with type-1 (destination prefix), type-2 (source prefix), type-5 (destination port), and/or type-6 (source port) encodings can be used to advertise routes. Various embodiments are further described herein below.

FIG. 3A is a block diagram illustrating efficient SNAT in the egress direction in a cloud network, according to some embodiments. As shown in the diagram, the cloud network 100 includes a gateway 120, a controller 110, switches 130A and 130B, and hosts 140A and 140B. Host 140A is communicatively coupled to switch 130A and host 140B is communicatively coupled to switch 130B. In one embodiment, one or more components of the cloud network 100 are implemented in a datacenter and the gateway 120 is a datacenter gateway. In one embodiment, the controller 110 is an SDN controller, a cloud orchestrator, or similar entity that is responsible for managing network elements in the cloud network 100. In one embodiment, one or more of the switches 130A and hosts 140 are virtualized. For example, switches 130A and 130B may be virtual switches and hosts 140A and 140B may be VMs. Hosts 140A and 140B may each be assigned a private IP address. In this example, host 140A is assigned private address 10.1.1.1 and host 140B is assigned private address 10.1.1.2. Also, in this example, switch 130A is associated with tunnel endpoint TEP-1, switch 130B is associated with tunnel endpoint TEP-2, and gateway 120 is associated with tunnel endpoint TEP-3. Switch 130A includes SNAT instance 137A, which is configured to perform SNAT for host 140A. Switch 130B includes SNAT instance 137B, which is configured to perform SNAT for host 140B.

The block diagram illustrates SNAT in the egress direction (i.e., from the private domain to the public domain). At operation 1, host 140A originates a Transmission Control Protocol (TCP) session using its private address. For example, host 140A may send a packet (e.g., TCP SYN) destined for the public domain with 10.1.1.1 (the private address of host 140A) as the source address and 5500 (a private port) as the source port. At operation 2, SNAT instance 137A of switch 130A maps the private address and private port (10.1.1.1 and 5500, respectively) to a public address and private port. In this example, the public address is 172.1.1.1 and the public port is 7000. The mapping can be performed by SNAT instance 137A itself or can be performed with the help of the controller 110 (e.g., by punting the packet to the controller 110 and having the controller 110 decide the mapping). At operation 3, switch 130A sends information about the mapping to the controller 110 (e.g., using a standardized management protocol such as OpenFlow, Netconf, Open vSwitch Database Management Protocol (OVSDB), or Extensible Messaging and Presence Protocol (XMPP)). In this example, this information may indicate that the translation for packets having source address 172.1.1.1 and source port 7000 are to be handled by switch 130A. At operation 4, the controller 110 sends an advertisement message to the gateway 120 indicating that packets having 172.1.1.1 as its destination address and 7000 as its destination port are to be forwarded to TEP-1 (e.g., forwarded to switch 130A over an overlay tunnel such as a Virtual Extensible Local Area Network (VXLAN)/Generic Routing Encapsulation (GRE) tunnel). In one embodiment, the advertisement message is a BGP Flowspec message, where the message includes an NLRI field that specifies 172.1.1.1 as the destination address and 7000 as the destination port and a next-hop field that specifies TEP-1 as the next-hop. At operation 5, switch 130A translates the source address of the packet to 172.1.1.1 (the public address) and translates the source port of the packet to 7000 (the public port) according to the mapping and sends the translated packet to the gateway 120. The gateway 120 then sends this packet to the public domain.

An example is described above where host 140A originates the packet. Similar operations can be performed if host 140B originates the packet. However, in this case the public port and the next-hop would be different (e.g., public port would be 8000 instead of 7000 and next-hop would be TEP-2 instead of TEP-1). To avoid conflicts, the public ports used by different SNAT instances should preferably be disjoint (i.e., not overlap). This can be achieved using central logic (e.g., implemented by the controller 110) that assigns public ports used by different SNAT instances.

In the example above, the controller 110 learns the SNAT mapping and sends the advertisement message to the gateway 120 (e.g., by acting as the BGP speaker). However, in other embodiments, there can be a separate entity (e.g., acting as a BGP speaker) that learns SNAT mappings/configurations (e.g., based on receiving messages from the controller 110) and sends advertisement messages (e.g., BGP Flowspec messages) to the gateway 120.

FIG. 4 is a diagram illustrating a message format for a BGP Flow Specification message, according to some embodiments. By way of example, a BGP Flowspec message that can be sent as part of operation 4 of FIG. 3A is shown in the diagram. It should be understood that different BGP Flowspec messages can contain different values than shown here (e.g., to advertise different destination address, protocol, destination port, and/or next-hop). As shown in the diagram, the BGP Flowspec message includes an Address Family Identifier (AFI) field, a Subsequent Address Family Identifier (SAFI) field, a Length of Next Hop Network Address field, a Network Address of Next Hop field, a Reserved field, and a Network Layer Reachability Information (NLRI) field. The AFI field is set to a value of 1 (indicating IP version 4), the SAFI field is set to a value of 134 (indicating dissemination of flow specification rules), the Length of Next Hop Network Address field is set to a value of 4, and the Network Address of Next Hop is set to the IP address of TEP-1. The NLRI field specifies a destination address, a protocol, and a destination port. The destination address is encoded as "0x01 20 ac 01 01 01," where "0x01" indicates destination-prefix type, "0x20" indicates prefix length of 32 (in hexadecimal), and "0xac 01 01 01" indicates a value of 172.1.1.1 (in hexadecimal). The protocol is encoded as "0x03 81 06," where "0x03" indicates protocol type, "0x81" indicates a numeric operator, and "0x06" indicates TCP protocol. The destination port is encoded as "0x05 81 1b58," where "0x05" indicates destination port type, "0x81" indicates a numeric operator, and "0x1b58" indicates a value of 7000.

Figure 3B:
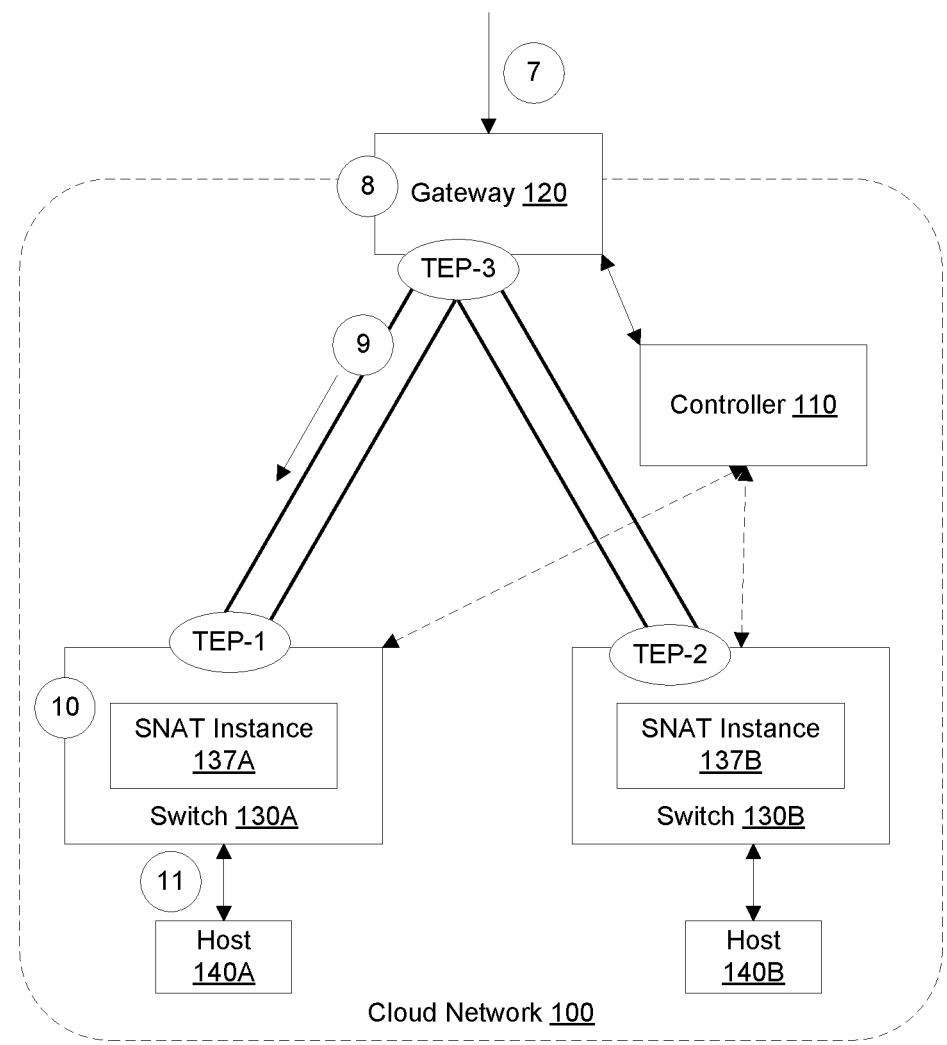
FIG. 3B is a block diagram illustrating efficient SNAT in the ingress direction in a cloud network, according to some embodiments.

FIG. 3B is a block diagram illustrating efficient SNAT in the ingress direction in a cloud network, according to some embodiment. The block diagram illustrates source network address translation in the ingress direction (i.e., from the public domain to the private domain). The block diagram continues the example introduced discussed above with reference to FIG. 3A. At operation 7, the gateway 120 receives a response packet (e.g., TCP SYN ACK). The packet has 172.1.1.1 (the public address) as its destination address and 7000 (the public port) as its destination port. At operation 8, the gateway 120 successfully matches this packet against the forwarding information base (FIB) entry corresponding to the advertisement message it received from controller 110 (e.g., advertisement message received as part of operation 4) and this entry indicates that TEP-1 is the next-hop. It should be noted that the access control list (ACL) matches corresponding to BGP Flowspec routes have precedence over regular IP longest prefix matches. At operation 9, the gateway 120 sends the packet to TEP-1 (e.g., over an overlay tunnel). SNAT instance 137A has the reverse mapping (from public address to private address) and at operation 10, translates the destination address of the packet to 10.1.1.1 (the private address of host 140A) and translates the destination port of the packet to 5500 (the private port). At operation 11, switch 130A sends the translated packet to host 140A.

Figure 5:
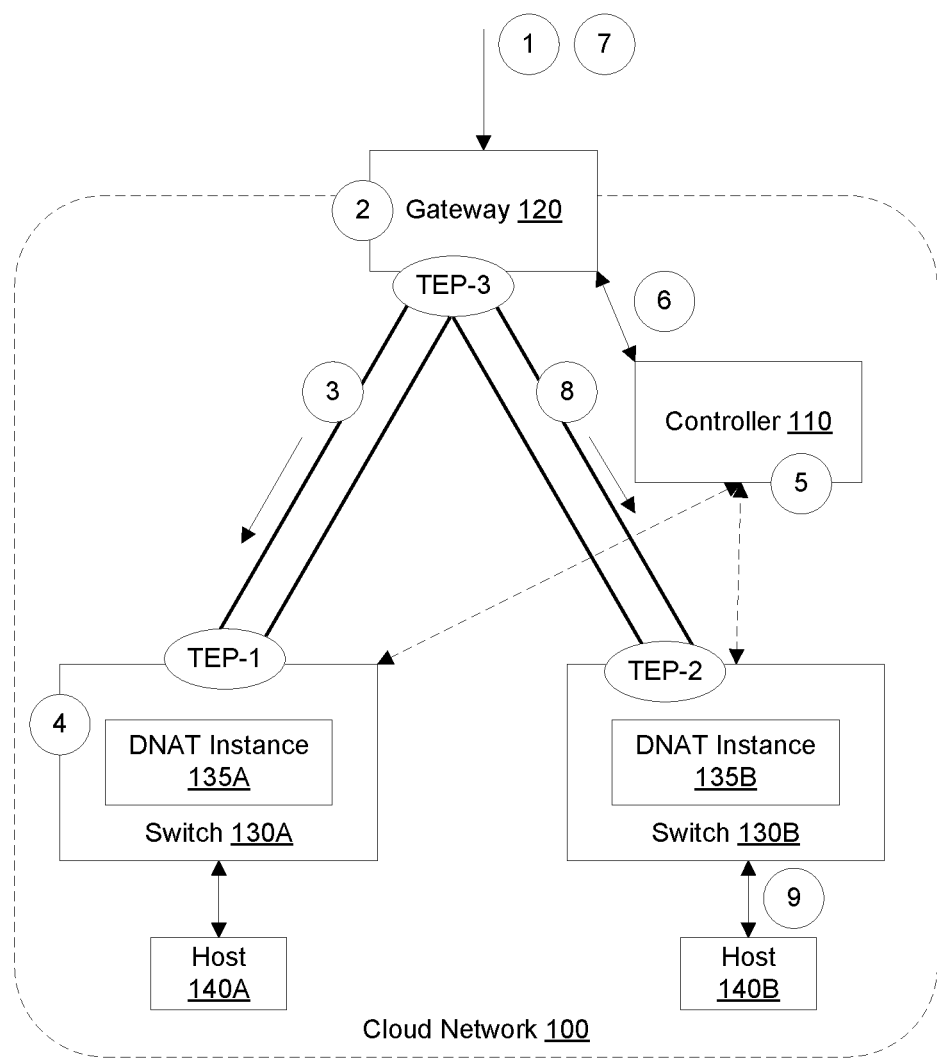
FIG. 5 is a block diagram illustrating efficient DNAT in a cloud network, according to some embodiments.

FIG. 5 is a block diagram illustrating efficient DNAT in a cloud network, according to some embodiments. As shown in the diagram, the cloud network 100 includes a gateway 120, a controller 110, switches 130A and 130B, and hosts 140A and 140B. Host 140A is communicatively coupled to switch 130A and host 140B is communicatively coupled to switch 130B. In one embodiment, one or more components of the cloud network 100 are implemented in a datacenter and the gateway 120 is a datacenter gateway. In one embodiment, the controller 110 is an SDN controller, a cloud orchestrator, or similar entity that is responsible for managing network elements in the cloud network 100. In one embodiment, one or more of the switches 130A and hosts 140 are virtualized. For example, switches 130A and 130B may be virtual switches and hosts 140A and 140B may be VMs. Hosts 140A and 140B may each be assigned a private address. In this example, host 140A is assigned private address 10.1.1.1 and host 140B is assigned private address 10.1.1.2. Also, in this example, hosts 140A and 140B host the same service/application (e.g., a web server) that can be accessed using public IP address 172.1.1.1. Also, in this example, switch 130A is associated with tunnel endpoint TEP-1, switch 130B is associated with tunnel endpoint TEP-2, and gateway 120 is associated with tunnel endpoint TEP-3. Switch 130A includes DNAT instance 135A, which is configured to perform DNAT for host 140A. Switch 130B includes DNAT instance 135B, which is configured to perform DNAT for host 140B.

The block diagram illustrates DNAT in the ingress direction (i.e., from the public domain to the private domain). At operation 1, the gateway 120 receives (from the public domain) a packet (e.g., the first packet of a new TCP connection (e.g., TCP SYN)) having 64.1.1.1 (a public address) as its source address and 172.1.1.1 (e.g., the public address of the service hosted by hosts 140A and 140B) as its destination address. At operation 2, the gateway 120 performs a lookup in its FIB and finds that there is no FIB entry (e.g., no BGP Flowspec route) for this packet. As a result, the gateway 120 performs a normal lookup (e.g., longest prefix match) for destination address 172.1.1.1 and determines that the next-hop is TEP-1 (this may be configured as the default next-hop advertised by the controller 110 for any new DNAT sessions). At operation 3, the gateway 120 sends the packet to switch 130A (e.g., over an overlay tunnel since TEP-1 is the next-hop). At operation 4, switch 130A punts the packet to the controller 110 since it does not match any existing DNAT sessions (the controller 110 may have previously programmed switch 130A to punt packets for any new DNAT sessions to the controller 110 so that controller 110 can make a load balancing decision). At operation 5, the controller 110 makes a load balancing decision for the flow. In this example, the controller 110 assigns the flow to host 140B and thus programs DNAT instance 135B of host 140B to translate the destination address of packets having 64.1.1.1 as its source address and 172.1.1.1 as its destination address to 10.1.1.2 (the private address of host 140B). Operations 4 and 5 may be performed using standardized management protocols such as one or more of OpenFlow, Netconf, OVSDB, and XMPP. At operation 6, the controller 110 sends an advertisement message to the gateway 120 indicating that packets having source address 64.1.1.1 and destination address 172.1.1.1 are to be forwarded to TEP-2 (e.g., over an overlay tunnel). In one embodiment, the advertisement message is a BGP Flowspec message, where the message includes an NLRI field that specifies 64.1.1.1 as the source address and 172.1.1.1 as the destination address and a next-hop field that specifies TEP-2 as the next-hop. In some embodiments, the source port and/or destination port can also be used for finer granularity of load balancing. In such embodiments, the advertisement message would also specify source port and/or destination port. At operation 7, the gateway 120 receives a subsequent packet having source IP address 64.1.1.1 and destination IP address 172.1.1.1. This time, the gateway 120 successfully matches the packet against the FIB entry corresponding to the advertisement message it received from the controller 110 (e.g., received as part of operation 6) and this entry indicates that TEP-2 is the next-hop. At operation 8, the gateway 120 thus sends the packet to switch 130B (since TEP-2 is the next-hop) (e.g., over an overlay tunnel). DNAT instance 135B of switch 130B has the mapping (from public address to private address) and at operation 9, translates the destination IP address of the packet to 10.1.1.2 (the private address of host 140B) and sends the translated packet to host 140B.

As can be seen from the example above, only the first packet needs to be sent to the load balancer (the controller 110 functions as the load balancer in the example above). Any subsequent packets in the same flow are load balanced at the gateway 120. This is achieved by sending the advertisement message to the gateway 120. Translation in the reverse path (i.e., from the private domain to the public domain) is handled inline by switch 130.

In the example above, the controller 110 acts as the load balancer and sends the advertisement message to the gateway 120 (e.g., acts as the BGP speaker). However, in other embodiments, there can be a separate load balancer that makes load balancing decisions and/or a separate entity (e.g., a BGP speaker) that learns DNAT mappings/configurations (e.g., based on receiving messages from the controller 110 and/or load balancer) and sends advertisement messages (e.g., BGP Flowspec messages) to the gateway 120.

FIG. 6 is a diagram illustrating a message format for a BGP Flow Specification message, according to some embodiments. By way of example, a BGP Flowspec message that can be sent as part of operation 6 of FIG. 5 is shown in the diagram. It should be understood that different BGP Flowspec messages may contain different values than shown here (e.g., to advertise different source address, destination address, and/or next-hop). As shown in the diagram, the BGP Flowspec message includes an AFI field, a SAFI field, a Length of Next Hop Network Address field, a Network Address of Next Hop field, a Reserved field, and an NLRI field. The AFI field is set to a value of 1 (indicating IP version 4), the SAFI field is set to a value of 134 (indicating dissemination of flow specification rules), the Length of Next Hop Network Address field is set to a value of 4, and the Network Address of Next Hop field is set to the IP address of TEP-2. The NLRI field specifies a destination address and a source address. The destination address is encoded as "0x01 20 ac 01 01 01," where "0x01" indicates destination-prefix type, "0x20" indicates prefix length of 32 (in hexadecimal), and "0xac 01 01 01" indicates a value of 172.1.1.1 (in hexadecimal). The source address is encoded as "0x02 20 40 01 01 01," where "0x02" indicates source-prefix type, "0x20" indicates prefix length of 32 (in hexadecimal), and "0x40 01 01 01" indicates a value of 64.1.1.1 (in hexadecimal).

Embodiments described herein provide several advantages over existing NAT models. For example, embodiments do not rely on a centralized NAT appliance to perform address translations (as in the centralized NAT models), which can act as a bottleneck. Also, embodiments avoid the extra hop to the centralized NAT appliance. This allows for lower packet latencies, reduced bandwidth consumption, and less congestion points. Also, embodiments do not require having a public address per node (e.g., per switch) to enable NAT (as in the distributed inline NAT models). This allows for easier management of public addresses and makes live migration of VMs easier. Also, embodiments may make use of BGP Flowspec without modification (and standardized southbound protocols such as OpenFlow) to enable NAT in the cloud network, which allows for simple implementation.

Figure 7:
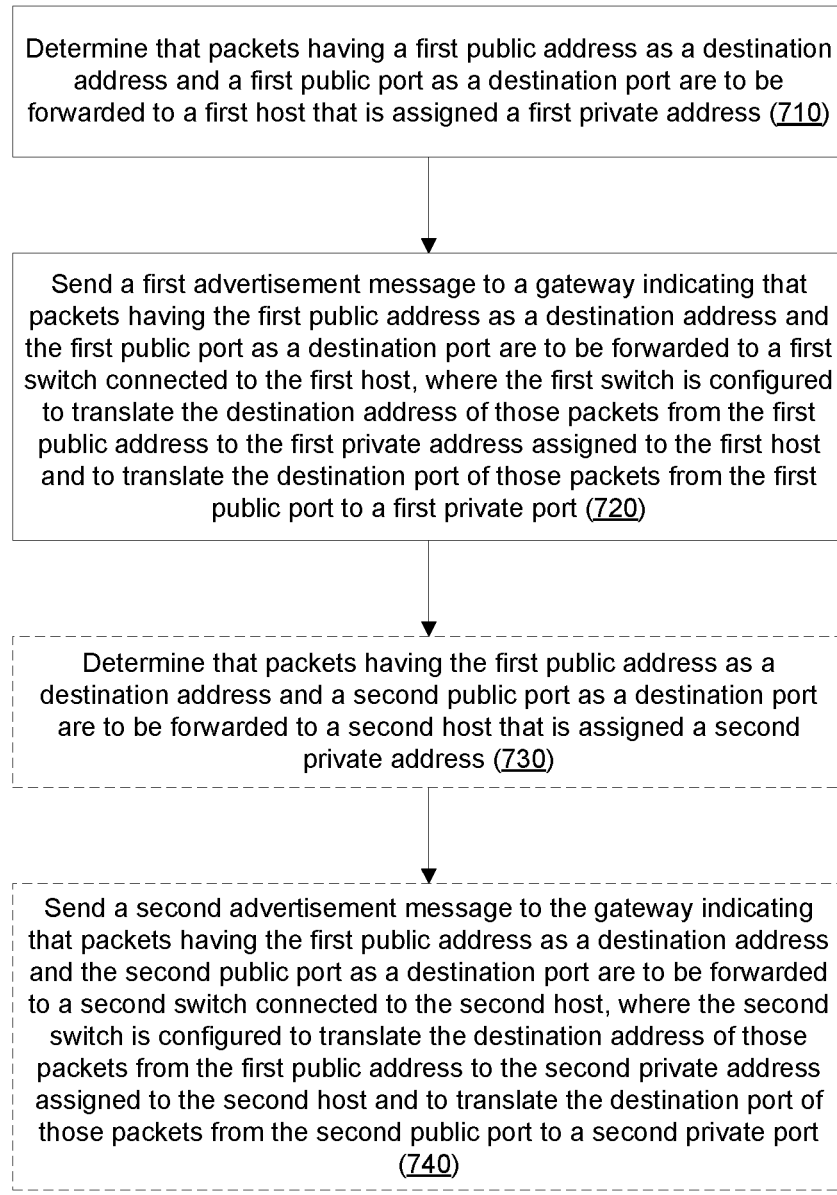
FIG. 7 is a flow diagram of a process for enabling efficient SNAT in a cloud network, according to some embodiments.

FIG. 7 is a flow diagram of a process for enabling efficient SNAT in a cloud network, according to some embodiments. In one embodiment, the process is implemented by a network device in the cloud network (e.g., a network device that acts as a BGP speaker). The operations in the flow diagrams may be implemented using hardware, software, firmware, or any combination thereof. The operations in the flow diagrams will be described with reference to the exemplary embodiments of the other figures. However, it should be understood that the operations of the flow diagrams can be performed by embodiments other than those discussed with reference to the other figures, and the embodiments discussed with reference to these other figures can perform operations different than those discussed with reference to the flow diagrams.

At block 710, the network device determines that packets having a first public address as a destination address and a first public port as a destination address are to be forwarded to a first host that is assigned a first private address. In one embodiment, the determination that packets having the first public address as a destination address and the first public port as a destination port are to be forwarded to the first host that is assigned the first private address is based on receiving a message from the first switch.

At block 720, the network device sends a first advertisement message to a gateway indicating that packets having the first public address as a destination address and the first public port as a destination port are to be forwarded to a first switch connected to the first host, where the first switch is configured to translate the destination address of those packets from the first public address to the first private address assigned to the first host and to translate the destination port of those packets from the first public port to a first private port. In one embodiment, the first switch is configured to translate, for packets having the first private address assigned to the first host as a source address and the first private port as a source port, the source address of those packets from the first private address assigned to the first host to the first public address and to translate the source port of those packets from the first private port to the first public port (for packets going outside of the cloud network). In one embodiment, the first advertisement message is a BGP Flowspec message. In such an embodiment, the first advertisement message may include a NLRI field that specifies the first public address as a destination address and the first public port as a destination port and a next-hop field that specifies an address assigned to the first switch. In one embodiment, the first host is a virtual machine and the first switch is a virtual switch connected to (or otherwise communicatively coupled to) the first host.

In one embodiment, at block 730, the network device determines that packets having the first public address as a destination address and a second public port (different from the first public port) as a destination port are to be forwarded to a second host that is assigned a second private address.

In one embodiment, at block 740, the network device sends a second advertisement message to the gateway indicating that packets having the first public address as a destination address and the second public port as a destination port are to be forwarded to a second switch connected to the second host, where the second switch is configured to translate the destination address of those packets from the first public address to the second private address assigned to the second host and to translate the destination port of those packets from the second public port to a second private port.

Figure 8:
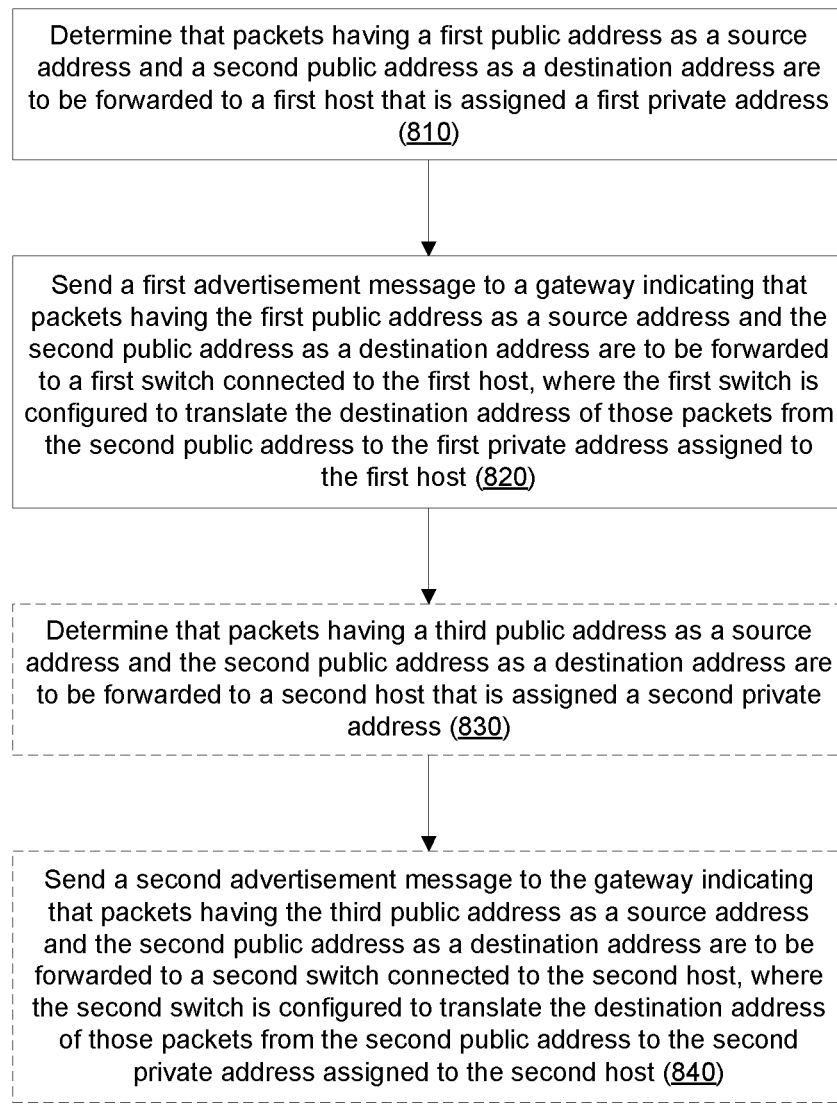
FIG. 8 is a flow diagram of a process for enabling efficient DNAT in a cloud network, according to some embodiments.

FIG. 8 is a flow diagram of a process for enabling efficient DNAT in a cloud network, according to some embodiments. In one embodiment, the process is implemented by a network device in the cloud network (e.g., a network device that acts as a BGP speaker). The operations in the flow diagrams may be implemented using hardware, software, firmware, or any combination thereof.

At block 810, the network device determines that packets having a first public address as a source address and a second public address as a destination address are to be forwarded to a first host that is assigned a first private address. In one embodiment, the determination that packets having the first public address as a source address and the second public address as a destination address are to be forwarded to the first host that is assigned the first private address is based on receiving a load balancing decision from a load balancer.

At block 820, the network device sends a first advertisement message to a gateway indicating that packets having the first public address as a source address and the second public address as a destination address are to be forwarded to a first switch connected to the first host, where the first switch is configured to translate the destination address of those packets from the second public address to the first private address assigned to the first host. In one embodiment, the first switch is configured to translate, for packets having the first private address assigned to the first host as a source address and the first public address as a destination address, the source address of those packets from the first private address assigned to the first host to the second public address (for packets going outside of the cloud network). In one embodiment, the first advertisement message is a Border Gateway Protocol (BGP) Flow Specification (Flowspec) message. In such an embodiment, the first advertisement message may include a NLRI field that specifies the first public address as a source address and the second public address as a destination address and a next-hop field that specifies an address assigned to the first switch. In one embodiment, the first host is a virtual machine and the first switch is a virtual switch connected to (or otherwise communicatively coupled to) the first host. In one embodiment, the first advertisement message further indicates a source port number and a destination port number for the packets that are to be forwarded to the first switch (e.g., for finer granularity of load balancing).

In one embodiment, at block 830, the network device determines that packets having a third public address as a source address and the second public address as a destination address are to be forwarded to a second host that is assigned a second private address.

In one embodiment, at block 840, the network device sends a second advertisement message to the gateway indicating that packets having the third public address as a source address and the second public address as a destination address are to be forwarded to a second switch connected to the second host, where the second switch is configured to translate the destination address of those packets from the second public address to the second private address assigned to the second host.

Figures 9A, 9B:
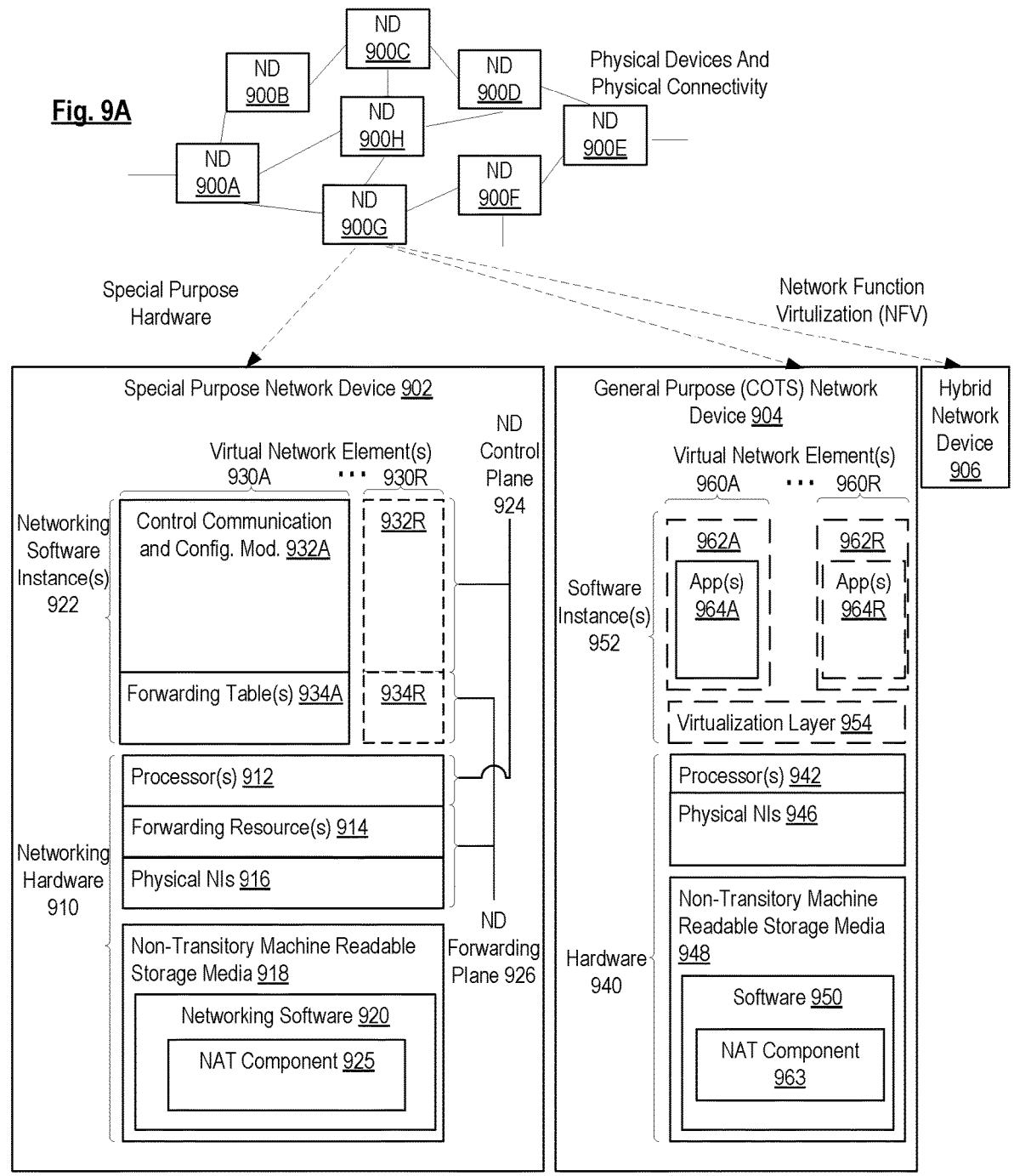
FIG. 9A illustrates connectivity between network devices (NDs) within an exemplary network, as well as three exemplary implementations of the NDs, according to some embodiments.
FIG. 9B illustrates an exemplary way to implement a special-purpose network device according to some embodiments.

FIG. 9A illustrates connectivity between network devices (NDs) within an exemplary network, as well as three exemplary implementations of the NDs, according to some embodiments. FIG. 9A shows NDs 900A-H, and their connectivity by way of lines between 900A-900B, 900B-900C, 900C-900D, 900D-900E, 900E-900F, 900F-900G, and 900A-900G, as well as between 900H and each of 900A, 900C, 900D, and 900G. These NDs are physical devices, and the connectivity between these NDs can be wireless or wired (often referred to as a link). An additional line extending from NDs 900A, 900E, and 900F illustrates that these NDs act as ingress and egress points for the network (and thus, these NDs are sometimes referred to as edge NDs; while the other NDs may be called core NDs).

Two of the exemplary ND implementations in FIG. 9A are: 1) a special-purpose network device 902 that uses custom application-specific integrated-circuits (ASICs) and a special-purpose operating system (OS); and 2) a general purpose network device 904 that uses common off-the-shelf (COTS) processors and a standard OS.

The special-purpose network device 902 includes networking hardware 910 comprising a set of one or more processor(s) 912, forwarding resource(s) 914 (which typically include one or more ASICs and/or network processors), and physical network interfaces (NIs) 916 (through which network connections are made, such as those shown by the connectivity between NDs 900A-H), as well as non-transitory machine readable storage media 918 having stored therein networking software 920. During operation, the networking software 920 may be executed by the networking hardware 910 to instantiate a set of one or more networking software instance(s) 922. Each of the networking software instance(s) 922, and that part of the networking hardware 910 that executes that network software instance (be it hardware dedicated to that networking software instance and/or time slices of hardware temporally shared by that networking software instance with others of the networking software instance(s) 922), form a separate virtual network element 930A-R. Each of the virtual network element(s) (VNEs) 930A-R includes a control communication and configuration module 932A-R (sometimes referred to as a local control module or control communication module) and forwarding table(s) 934A-R, such that a given virtual network element (e.g., 930A) includes the control communication and configuration module (e.g., 932A), a set of one or more forwarding table(s) (e.g., 934A), and that portion of the networking hardware 910 that executes the virtual network element (e.g., 930A).

Software 920 can include code such as NAT component 925, which when executed by networking hardware 910, causes the special-purpose network device 902 to perform operations of one or more embodiments described herein above as part networking software instances 922 (e.g., to enable efficient network address translation (e.g., SNAT and/or DNAT) as described herein).

The special-purpose network device 902 is often physically and/or logically considered to include: 1) a ND control plane 924 (sometimes referred to as a control plane) comprising the processor(s) 912 that execute the control communication and configuration module(s) 932A-R; and 2) a ND forwarding plane 926 (sometimes referred to as a forwarding plane, a data plane, or a media plane) comprising the forwarding resource(s) 914 that utilize the forwarding table(s) 934A-R and the physical NIs 916. By way of example, where the ND is a router (or is implementing routing functionality), the ND control plane 924 (the processor(s) 912 executing the control communication and configuration module(s) 932A-R) is typically responsible for participating in controlling how data (e.g., packets) is to be routed (e.g., the next-hop for the data and the outgoing physical NI for that data) and storing that routing information in the forwarding table(s) 934A-R, and the ND forwarding plane 926 is responsible for receiving that data on the physical NIs 916 and forwarding that data out the appropriate ones of the physical NIs 916 based on the forwarding table(s) 934A-R.

FIG. 9B illustrates an exemplary way to implement the special-purpose network device 902 according to some embodiments. FIG. 9B shows a special-purpose network device including cards 938 (typically hot pluggable). While in some embodiments the cards 938 are of two types (one or more that operate as the ND forwarding plane 926 (sometimes called line cards), and one or more that operate to implement the ND control plane 924 (sometimes called control cards)), alternative embodiments may combine functionality onto a single card and/or include additional card types (e.g., one additional type of card is called a service card, resource card, or multi-application card). A service card can provide specialized processing (e.g., Layer 4 to Layer 7 services (e.g., firewall, Internet Protocol Security (IPsec), Secure Sockets Layer (SSL)/Transport Layer Security (TLS), Intrusion Detection System (IDS), peer-to-peer (P2P), Voice over IP (VoIP) Session Border Controller, Mobile Wireless Gateways (Gateway General Packet Radio Service (GPRS) Support Node (GGSN), Evolved Packet Core (EPC) Gateway)). By way of example, a service card may be used to terminate IPsec tunnels and execute the attendant authentication and encryption algorithms. These cards are coupled together through one or more interconnect mechanisms illustrated as backplane 936 (e.g., a first full mesh coupling the line cards and a second full mesh coupling all of the cards).

Returning to FIG. 9A, the general purpose network device 904 includes hardware 940 comprising a set of one or more processor(s) 942 (which are often COTS processors) and physical NIs 946, as well as non-transitory machine readable storage media 948 having stored therein software 950. During operation, the processor(s) 942 execute the software 950 to instantiate one or more sets of one or more applications 964A-R. While one embodiment does not implement virtualization, alternative embodiments may use different forms of virtualization. For example, in one such alternative embodiment the virtualization layer 954 represents the kernel of an operating system (or a shim executing on a base operating system) that allows for the creation of multiple instances 962A-R called software containers that may each be used to execute one (or more) of the sets of applications 964A-R; where the multiple software containers (also called virtualization engines, virtual private servers, or jails) are user spaces (typically a virtual memory space) that are separate from each other and separate from the kernel space in which the operating system is run; and where the set of applications running in a given user space, unless explicitly allowed, cannot access the memory of the other processes. In another such alternative embodiment the virtualization layer 954 represents a hypervisor (sometimes referred to as a virtual machine monitor (VMM)) or a hypervisor executing on top of a host operating system, and each of the sets of applications 964A-R is run on top of a guest operating system within an instance 962A-R called a virtual machine (which may in some cases be considered a tightly isolated form of software container) that is run on top of the hypervisor—the guest operating system and application may not know they are running on a virtual machine as opposed to running on a "bare metal" host electronic device, or through para-virtualization the operating system and/or application may be aware of the presence of virtualization for optimization purposes. In yet other alternative embodiments, one, some or all of the applications are implemented as unikernel(s), which can be generated by compiling directly with an application only a limited set of libraries from a library operating system (LibOS) including drivers/Libraries of OS services) that provide the particular OS services needed by the application. As a unikernel can be implemented to run directly on hardware 940, directly on a hypervisor (in which case the unikernel is sometimes described as running within a LibOS virtual machine), or in a software container, embodiments can be implemented fully with unikernels running directly on a hypervisor represented by virtualization layer 954, unikernels running within software containers represented by instances 962A-R, or as a combination of unikernels and the above-described techniques (e.g., unikernels and virtual machines both run directly on a hypervisor, unikernels and sets of applications that are run in different software containers).

The instantiation of the one or more sets of one or more applications 964A-R, as well as virtualization if implemented, are collectively referred to as software instance(s) 952. Each set of applications 964A-R, corresponding virtualization construct (e.g., instance 962A-R) if implemented, and that part of the hardware 940 that executes them (be it hardware dedicated to that execution and/or time slices of hardware temporally shared), forms a separate virtual network element(s) 960A-R.

The virtual network element(s) 960A-R perform similar functionality to the virtual network element(s) 930A-R—e.g., similar to the control communication and configuration module(s) 932A and forwarding table(s) 934A (this virtualization of the hardware 940 is sometimes referred to as network function virtualization (NFV)). Thus, NFV may be used to consolidate many network equipment types onto industry standard high volume server hardware, physical switches, and physical storage, which could be located in Data centers, NDs, and customer premise equipment (CPE). While embodiments are illustrated with each instance 962A-R corresponding to one VNE 960A-R, alternative embodiments may implement this correspondence at a finer level granularity (e.g., line card virtual machines virtualize line cards, control card virtual machine virtualize control cards, etc.); it should be understood that the techniques described herein with reference to a correspondence of instances 962A-R to VNEs also apply to embodiments where such a finer level of granularity and/or unikernels are used.

In certain embodiments, the virtualization layer 954 includes a virtual switch that provides similar forwarding services as a physical Ethernet switch. Specifically, this virtual switch forwards traffic between instances 962A-R and the physical NI(s) 946, as well as optionally between the instances 962A-R; in addition, this virtual switch may enforce network isolation between the VNEs 960A-R that by policy are not permitted to communicate with each other (e.g., by honoring virtual local area networks (VLANs)).

Software 950 can include code such as NAT component 963, which when executed by processor(s) 942, cause the general purpose network device 904 to perform operations of one or more embodiments described herein above as part of software instances 962A-R (e.g., to enable efficient network address translation (e.g., SNAT and/or DNAT) as described herein).

The third exemplary ND implementation in FIG. 9A is a hybrid network device 906, which includes both custom ASICs/special-purpose OS and COTS processors/standard OS in a single ND or a single card within an ND. In certain embodiments of such a hybrid network device, a platform VM (i.e., a VM that that implements the functionality of the special-purpose network device 902) could provide for para-virtualization to the networking hardware present in the hybrid network device 906.

Regardless of the above exemplary implementations of an ND, when a single one of multiple VNEs implemented by an ND is being considered (e.g., only one of the VNEs is part of a given virtual network) or where only a single VNE is currently being implemented by an ND, the shortened term network element (NE) is sometimes used to refer to that VNE. Also in all of the above exemplary implementations, each of the VNEs (e.g., VNE(s) 930A-R, VNEs 960A-R, and those in the hybrid network device 906) receives data on the physical NIs (e.g., 916, 946) and forwards that data out the appropriate ones of the physical NIs (e.g., 916, 946). For example, a VNE implementing IP router functionality forwards IP packets on the basis of some of the IP header information in the IP packet; where IP header information includes source IP address, destination IP address, source port, destination port (where "source port" and "destination port" refer herein to protocol ports, as opposed to physical ports of a ND), transport protocol (e.g., user datagram protocol (UDP), Transmission Control Protocol (TCP), and differentiated services code point (DSCP) values.

Figure 9C:
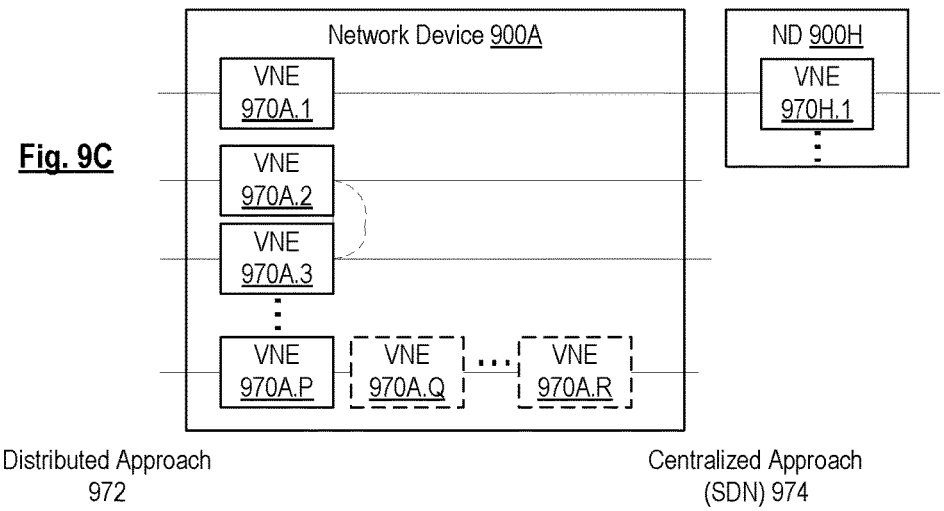
FIG. 9C illustrates various exemplary ways in which virtual network elements (VNEs) may be coupled according to some embodiments.

FIG. 9C illustrates various exemplary ways in which VNEs may be coupled according to some embodiments. FIG. 9C shows VNEs 970A.1-970A.P (and optionally VNEs 970A.Q-970A.R) implemented in ND 900A and VNE 970H.1 in ND 900H. In FIG. 9C, VNEs 970A.1-P are separate from each other in the sense that they can receive packets from outside ND 900A and forward packets outside of ND 900A; VNE 970A.1 is coupled with VNE 970H.1, and thus they communicate packets between their respective NDs; VNE 970A.2-970A.3 may optionally forward packets between themselves without forwarding them outside of the ND 900A; and VNE 970A.P may optionally be the first in a chain of VNEs that includes VNE 970A.Q followed by VNE 970A.R (this is sometimes referred to as dynamic service chaining, where each of the VNEs in the series of VNEs provides a different service—e.g., one or more layer 4-7 network services). While FIG. 9C illustrates various exemplary relationships between the VNEs, alternative embodiments may support other relationships (e.g., more/fewer VNEs, more/fewer dynamic service chains, multiple different dynamic service chains with some common VNEs and some different VNEs).

The NDs of FIG. 9A, for example, may form part of the Internet or a private network; and other electronic devices (not shown; such as end user devices including workstations, laptops, netbooks, tablets, palm tops, mobile phones, smartphones, phablets, multimedia phones, Voice Over Internet Protocol (VOIP) phones, terminals, portable media players, GPS units, wearable devices, gaming systems, set-top boxes, Internet enabled household appliances) may be coupled to the network (directly or through other networks such as access networks) to communicate over the network (e.g., the Internet or virtual private networks (VPNs) overlaid on (e.g., tunneled through) the Internet) with each other (directly or through servers) and/or access content and/or services. Such content and/or services are typically provided by one or more servers (not shown) belonging to a service/content provider or one or more end user devices (not shown) participating in a peer-to-peer (P2P) service, and may include, for example, public webpages (e.g., free content, store fronts, search services), private webpages (e.g., username/password accessed webpages providing email services), and/or corporate networks over VPNs. For instance, end user devices may be coupled (e.g., through customer premise equipment coupled to an access network (wired or wirelessly)) to edge NDs, which are coupled (e.g., through one or more core NDs) to other edge NDs, which are coupled to electronic devices acting as servers. However, through compute and storage virtualization, one or more of the electronic devices operating as the NDs in FIG. 9A may also host one or more such servers (e.g., in the case of the general purpose network device 904, one or more of the software instances 962A-R may operate as servers; the same would be true for the hybrid network device 906; in the case of the special-purpose network device 902, one or more such servers could also be run on a virtualization layer executed by the processor(s) 912); in which case the servers are said to be co-located with the VNEs of that ND.

A virtual network is a logical abstraction of a physical network (such as that in FIG. 9A) that provides network services (e.g., L2 and/or L3 services). A virtual network can be implemented as an overlay network (sometimes referred to as a network virtualization overlay) that provides network services (e.g., layer 2 (L2, data link layer) and/or layer 3 (L3, network layer) services) over an underlay network (e.g., an L3 network, such as an Internet Protocol (IP) network that uses tunnels (e.g., generic routing encapsulation (GRE), layer 2 tunneling protocol (L2TP), IPSec) to create the overlay network).

A network virtualization edge (NVE) sits at the edge of the underlay network and participates in implementing the network virtualization; the network-facing side of the NVE uses the underlay network to tunnel frames to and from other NVEs; the outward-facing side of the NVE sends and receives data to and from systems outside the network. A virtual network instance (VNI) is a specific instance of a virtual network on a NVE (e.g., a NE/VNE on an ND, a part of a NE/VNE on a ND where that NE/VNE is divided into multiple VNEs through emulation); one or more VNIs can be instantiated on an NVE (e.g., as different VNEs on an ND). A virtual access point (VAP) is a logical connection point on the NVE for connecting external systems to a virtual network; a VAP can be physical or virtual ports identified through logical interface identifiers (e.g., a VLAN ID).

Examples of network services include: 1) an Ethernet LAN emulation service (an Ethernet-based multipoint service similar to an Internet Engineering Task Force (IETF) Multiprotocol Label Switching (MPLS) or Ethernet VPN (EVPN) service) in which external systems are interconnected across the network by a LAN environment over the underlay network (e.g., an NVE provides separate L2 VNIs (virtual switching instances) for different such virtual networks, and L3 (e.g., IP/MPLS) tunneling encapsulation across the underlay network); and 2) a virtualized IP forwarding service (similar to IETF IP VPN (e.g., Border Gateway Protocol (BGP)/MPLS IPVPN) from a service definition perspective) in which external systems are interconnected across the network by an L3 environment over the underlay network (e.g., an NVE provides separate L3 VNIs (forwarding and routing instances) for different such virtual networks, and L3 (e.g., IP/MPLS) tunneling encapsulation across the underlay network)). Network services may also include quality of service capabilities (e.g., traffic classification marking, traffic conditioning and scheduling), security capabilities (e.g., filters to protect customer premises from network-originated attacks, to avoid malformed route announcements), and management capabilities (e.g., full detection and processing).

Figure 9D:
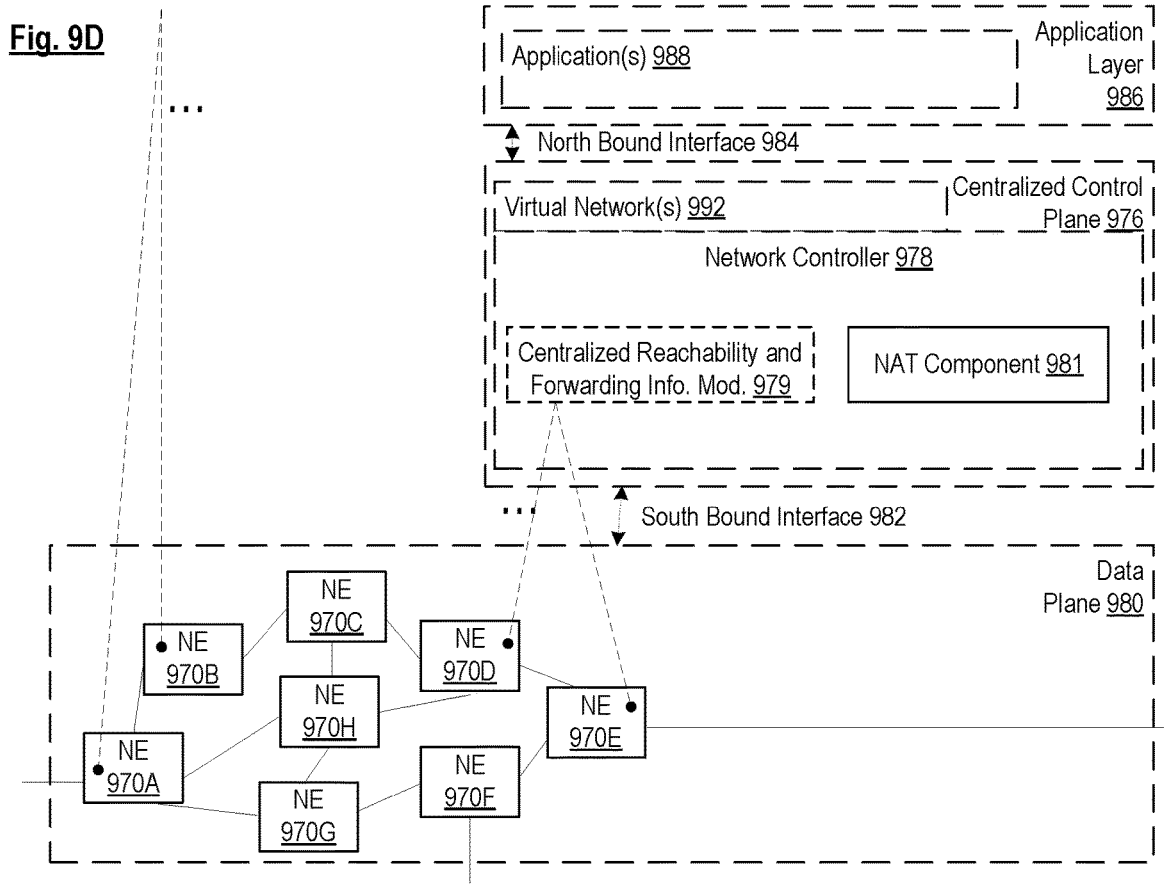
FIG. 9D illustrates a network with a single network element (NE) on each of the NDs, and within this straight forward approach contrasts a traditional distributed approach (commonly used by traditional routers) with a centralized approach for maintaining reachability and forwarding information (also called network control), according to some embodiments.

FIG. 9D illustrates a network with a single network element on each of the NDs of FIG. 9A, and within this straight forward approach contrasts a traditional distributed approach (commonly used by traditional routers) with a centralized approach for maintaining reachability and forwarding information (also called network control), according to some embodiments. Specifically, FIG. 9D illustrates network elements (NEs) 970A-H with the same connectivity as the NDs 900A-H of FIG. 9A.

FIG. 9D illustrates that the distributed approach 972 distributes responsibility for generating the reachability and forwarding information across the NEs 970A-H; in other words, the process of neighbor discovery and topology discovery is distributed.

For example, where the special-purpose network device 902 is used, the control communication and configuration module(s) 932A-R of the ND control plane 924 typically include a reachability and forwarding information module to implement one or more routing protocols (e.g., an exterior gateway protocol such as Border Gateway Protocol (BGP), Interior Gateway Protocol(s) (IGP) (e.g., Open Shortest Path First (OSPF), Intermediate System to Intermediate System (IS-IS), Routing Information Protocol (RIP), Label Distribution Protocol (LDP), Resource Reservation Protocol (RSVP) (including RSVP-Traffic Engineering (TE): Extensions to RSVP for LSP Tunnels and Generalized Multi-Protocol Label Switching (GMPLS) Signaling RSVP-TE)) that communicate with other NEs to exchange routes, and then selects those routes based on one or more routing metrics. Thus, the NEs 970A-H (e.g., the processor(s) 912 executing the control communication and configuration module(s) 932A-R) perform their responsibility for participating in controlling how data (e.g., packets) is to be routed (e.g., the next-hop for the data and the outgoing physical NI for that data) by distributively determining the reachability within the network and calculating their respective forwarding information. Routes and adjacencies are stored in one or more routing structures (e.g., Routing Information Base (RIB), Label Information Base (LIB), one or more adjacency structures) on the ND control plane 924. The ND control plane 924 programs the ND forwarding plane 926 with information (e.g., adjacency and route information) based on the routing structure(s). For example, the ND control plane 924 programs the adjacency and route information into one or more forwarding table(s) 934A-R (e.g., Forwarding Information Base (FIB), Label Forwarding Information Base (LFIB), and one or more adjacency structures) on the ND forwarding plane 926. For layer 2 forwarding, the ND can store one or more bridging tables that are used to forward data based on the layer 2 information in that data. While the above example uses the special-purpose network device 902, the same distributed approach 972 can be implemented on the general purpose network device 904 and the hybrid network device 906.

FIG. 9D illustrates that a centralized approach 974 (also known as software defined networking (SDN)) that decouples the system that makes decisions about where traffic is sent from the underlying systems that forwards traffic to the selected destination. The illustrated centralized approach 974 has the responsibility for the generation of reachability and forwarding information in a centralized control plane 976 (sometimes referred to as a SDN control module, controller, network controller, OpenFlow controller, SDN controller, control plane node, network virtualization authority, or management control entity), and thus the process of neighbor discovery and topology discovery is centralized. The centralized control plane 976 has a south bound interface 982 with a data plane 980 (sometime referred to the infrastructure layer, network forwarding plane, or forwarding plane (which should not be confused with a ND forwarding plane)) that includes the NEs 970A-H (sometimes referred to as switches, forwarding elements, data plane elements, or nodes). The centralized control plane 976 includes a network controller 978, which includes a centralized reachability and forwarding information module 979 that determines the reachability within the network and distributes the forwarding information to the NEs 970A-H of the data plane 980 over the south bound interface 982 (which may use the OpenFlow protocol). Thus, the network intelligence is centralized in the centralized control plane 976 executing on electronic devices that are typically separate from the NDs.

In one embodiment, the network controller 978 may include a NAT component 981 that when executed by the network controller 978, causes the network controller 978 to perform operations of one or more embodiments described herein above (e.g., to enable efficient network address translation (e.g., SNAT and/or DNAT) as described herein).

For example, where the special-purpose network device 902 is used in the data plane 980, each of the control communication and configuration module(s) 932A-R of the ND control plane 924 typically include a control agent that provides the VNE side of the south bound interface 982. In this case, the ND control plane 924 (the processor(s) 912 executing the control communication and configuration module(s) 932A-R) performs its responsibility for participating in controlling how data (e.g., packets) is to be routed (e.g., the next-hop for the data and the outgoing physical NI for that data) through the control agent communicating with the centralized control plane 976 to receive the forwarding information (and in some cases, the reachability information) from the centralized reachability and forwarding information module 979 (it should be understood that in some embodiments, the control communication and configuration module(s) 932A-R, in addition to communicating with the centralized control plane 976, may also play some role in determining reachability and/or calculating forwarding information—albeit less so than in the case of a distributed approach; such embodiments are generally considered to fall under the centralized approach 974, but may also be considered a hybrid approach).

While the above example uses the special-purpose network device 902, the same centralized approach 974 can be implemented with the general purpose network device 904 (e.g., each of the VNE 960A-R performs its responsibility for controlling how data (e.g., packets) is to be routed (e.g., the next-hop for the data and the outgoing physical NI for that data) by communicating with the centralized control plane 976 to receive the forwarding information (and in some cases, the reachability information) from the centralized reachability and forwarding information module 979; it should be understood that in some embodiments, the VNEs 960A-R, in addition to communicating with the centralized control plane 976, may also play some role in determining reachability and/or calculating forwarding information—albeit less so than in the case of a distributed approach) and the hybrid network device 906. In fact, the use of SDN techniques can enhance the NFV techniques typically used in the general purpose network device 904 or hybrid network device 906 implementations as NFV is able to support SDN by providing an infrastructure upon which the SDN software can be run, and NFV and SDN both aim to make use of commodity server hardware and physical switches.

FIG. 9D also shows that the centralized control plane 976 has a north bound interface 984 to an application layer 986, in which resides application(s) 988. The centralized control plane 976 has the ability to form virtual networks 992 (sometimes referred to as a logical forwarding plane, network services, or overlay networks (with the NEs 970A-H of the data plane 980 being the underlay network)) for the application(s) 988. Thus, the centralized control plane 976 maintains a global view of all NDs and configured NEs/VNEs, and it maps the virtual networks to the underlying NDs efficiently (including maintaining these mappings as the physical network changes either through hardware (ND, link, or ND component) failure, addition, or removal).

While FIG. 9D shows the distributed approach 972 separate from the centralized approach 974, the effort of network control may be distributed differently or the two combined in certain embodiments. For example: 1) embodiments may generally use the centralized approach (SDN) 974, but have certain functions delegated to the NEs (e.g., the distributed approach may be used to implement one or more of fault monitoring, performance monitoring, protection switching, and primitives for neighbor and/or topology discovery); or 2) embodiments may perform neighbor discovery and topology discovery via both the centralized control plane and the distributed protocols, and the results compared to raise exceptions where they do not agree. Such embodiments are generally considered to fall under the centralized approach 974, but may also be considered a hybrid approach.

While FIG. 9D illustrates the simple case where each of the NDs 900A-H implements a single NE 970A-H, it should be understood that the network control approaches described with reference to FIG. 9D also work for networks where one or more of the NDs 900A-H implement multiple VNEs (e.g., VNEs 930A-R, VNEs 960A-R, those in the hybrid network device 906). Alternatively or in addition, the network controller 978 may also emulate the implementation of multiple VNEs in a single ND. Specifically, instead of (or in addition to) implementing multiple VNEs in a single ND, the network controller 978 may present the implementation of a VNE/NE in a single ND as multiple VNEs in the virtual networks 992 (all in the same one of the virtual network(s) 992, each in different ones of the virtual network(s) 992, or some combination). For example, the network controller 978 may cause an ND to implement a single VNE (a NE) in the underlay network, and then logically divide up the resources of that NE within the centralized control plane 976 to present different VNEs in the virtual network(s) 992 (where these different VNEs in the overlay networks are sharing the resources of the single VNE/NE implementation on the ND in the underlay network).

Figure 9E:
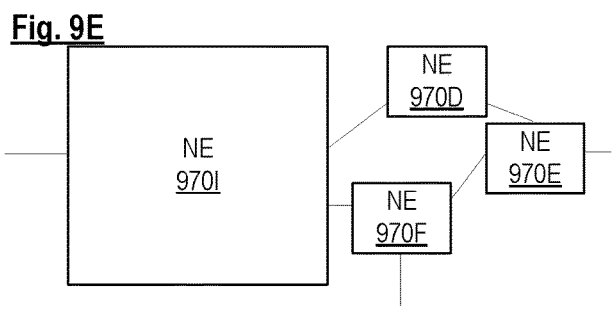
FIG. 9E illustrates the simple case of where each of the NDs implements a single NE, but a centralized control plane has abstracted multiple of the NEs in different NDs into (to represent) a single NE in one of the virtual network(s), according to some embodiments.
Figure 9F:
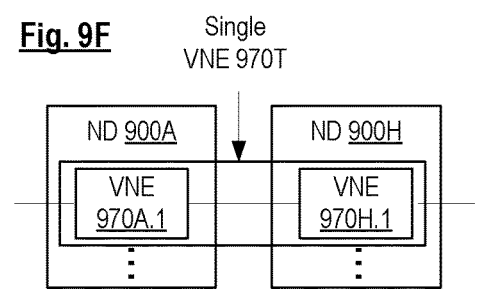
FIG. 9F illustrates a case where multiple VNEs are implemented on different NDs and are coupled to each other, and where a centralized control plane has abstracted these multiple VNEs such that they appear as a single VNE within one of the virtual networks, according to some embodiments.

On the other hand, FIGS. 9E and 9F respectively illustrate exemplary abstractions of NEs and VNEs that the network controller 978 may present as part of different ones of the virtual networks 992. FIG. 9E illustrates the simple case of where each of the NDs 900A-H implements a single NE 970A-H (see FIG. 9D), but the centralized control plane 976 has abstracted multiple of the NEs in different NDs (the NEs 970A-C and G-H) into (to represent) a single NE 9701 in one of the virtual network(s) 992 of FIG. 9D, according to some embodiments. FIG. 9E shows that in this virtual network, the NE 970I is coupled to NE 970D and 970F, which are both still coupled to NE 970E.

FIG. 9F illustrates a case where multiple VNEs (VNE 970A.1 and VNE 970H.1) are implemented on different NDs (ND 900A and ND 900H) and are coupled to each other, and where the centralized control plane 976 has abstracted these multiple VNEs such that they appear as a single VNE 970T within one of the virtual networks 992 of FIG. 9D, according to some embodiments. Thus, the abstraction of a NE or VNE can span multiple NDs.

While some embodiments implement the centralized control plane 976 as a single entity (e.g., a single instance of software running on a single electronic device), alternative embodiments may spread the functionality across multiple entities for redundancy and/or scalability purposes (e.g., multiple instances of software running on different electronic devices).

Figure 10:
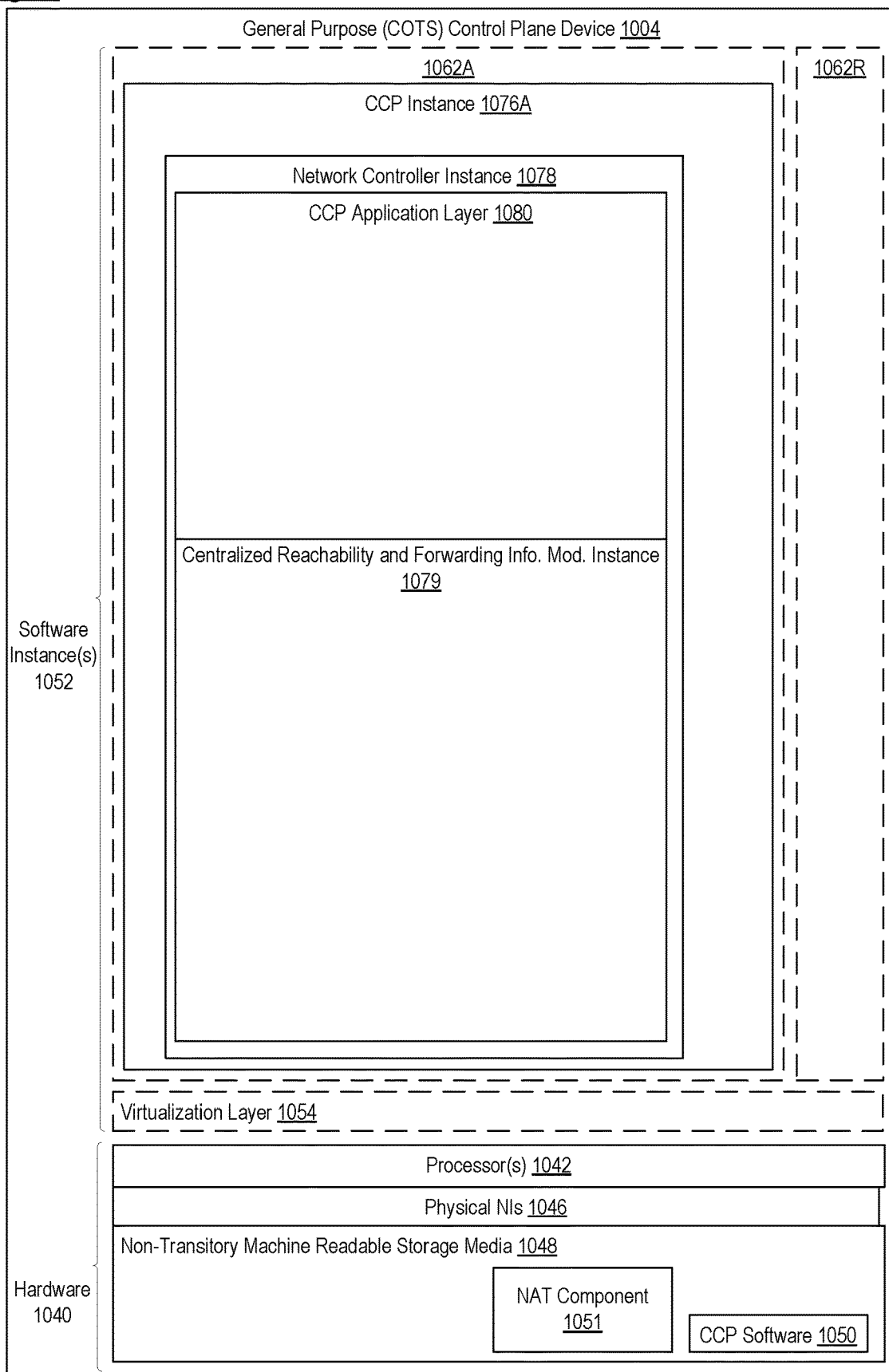
FIG. 10 illustrates a general purpose control plane device with centralized control plane (CCP) software, according to some embodiments.

Similar to the network device implementations, the electronic device(s) running the centralized control plane 976, and thus the network controller 978 including the centralized reachability and forwarding information module 979, may be implemented a variety of ways (e.g., a special purpose device, a general-purpose (e.g., COTS) device, or hybrid device). These electronic device(s) would similarly include processor(s), a set or one or more physical NIs, and a non-transitory machine-readable storage medium having stored thereon the centralized control plane software. For instance, FIG. 10 illustrates, a general purpose control plane device 1004 including hardware 1040 comprising a set of one or more processor(s) 1042 (which are often COTS processors) and physical NIs 1046, as well as non-transitory machine readable storage media 1048 having stored therein centralized control plane (CCP) software 1050 and a NAT component 1051.

In embodiments that use compute virtualization, the processor(s) 1042 typically execute software to instantiate a virtualization layer 1054 (e.g., in one embodiment the virtualization layer 1054 represents the kernel of an operating system (or a shim executing on a base operating system) that allows for the creation of multiple instances 1062A-R called software containers (representing separate user spaces and also called virtualization engines, virtual private servers, or jails) that may each be used to execute a set of one or more applications; in another embodiment the virtualization layer 1054 represents a hypervisor (sometimes referred to as a virtual machine monitor (VMM)) or a hypervisor executing on top of a host operating system, and an application is run on top of a guest operating system within an instance 1062A-R called a virtual machine (which in some cases may be considered a tightly isolated form of software container) that is run by the hypervisor; in another embodiment, an application is implemented as a unikernel, which can be generated by compiling directly with an application only a limited set of libraries (e.g., from a library operating system (LibOS) including drivers/libraries of OS services) that provide the particular OS services needed by the application, and the unikernel can run directly on hardware 1040, directly on a hypervisor represented by virtualization layer 1054 (in which case the unikernel is sometimes described as running within a LibOS virtual machine), or in a software container represented by one of instances 1062A-R). Again, in embodiments where compute virtualization is used, during operation an instance of the CCP software 1050 (illustrated as CCP instance 1076A) is executed (e.g., within the instance 1062A) on the virtualization layer 1054. In embodiments where compute virtualization is not used, the CCP instance 1076A is executed, as a unikernel or on top of a host operating system, on the "bare metal" general purpose control plane device 1004. The instantiation of the CCP instance 1076A, as well as the virtualization layer 1054 and instances 1062A-R if implemented, are collectively referred to as software instance(s) 1052.

In some embodiments, the CCP instance 1076A includes a network controller instance 1078. The network controller instance 1078 includes a centralized reachability and forwarding information module instance 1079 (which is a middleware layer providing the context of the network controller 978 to the operating system and communicating with the various NEs), and an CCP application layer 1080 (sometimes referred to as an application layer) over the middleware layer (providing the intelligence required for various network operations such as protocols, network situational awareness, and user-interfaces). At a more abstract level, this CCP application layer 1080 within the centralized control plane 976 works with virtual network view(s) (logical view(s) of the network) and the middleware layer provides the conversion from the virtual networks to the physical view.

The NAT component 1051 can be executed by hardware 1040 to perform operations of one or more embodiments described herein above as part of software instances 1052 (e.g., to enable efficient network address translation (e.g., SNAT and/or DNAT) as described herein).

The centralized control plane 976 transmits relevant messages to the data plane 980 based on CCP application layer 1080 calculations and middleware layer mapping for each flow. A flow may be defined as a set of packets whose headers match a given pattern of bits; in this sense, traditional IP forwarding is also flow-based forwarding where the flows are defined by the destination IP address for example; however, in other implementations, the given pattern of bits used for a flow definition may include more fields (e.g., 10 or more) in the packet headers. Different NDs/NEs/VNEs of the data plane 980 may receive different messages, and thus different forwarding information. The data plane 980 processes these messages and programs the appropriate flow information and corresponding actions in the forwarding tables (sometime referred to as flow tables) of the appropriate NE/VNEs, and then the NEs/VNEs map incoming packets to flows represented in the forwarding tables and forward packets based on the matches in the forwarding tables.

Standards such as OpenFlow define the protocols used for the messages, as well as a model for processing the packets. The model for processing packets includes header parsing, packet classification, and making forwarding decisions. Header parsing describes how to interpret a packet based upon a well-known set of protocols. Some protocol fields are used to build a match structure (or key) that will be used in packet classification (e.g., a first key field could be a source media access control (MAC) address, and a second key field could be a destination MAC address).

Packet classification involves executing a lookup in memory to classify the packet by determining which entry (also referred to as a forwarding table entry or flow entry) in the forwarding tables best matches the packet based upon the match structure, or key, of the forwarding table entries. It is possible that many flows represented in the forwarding table entries can correspond/match to a packet; in this case the system is typically configured to determine one forwarding table entry from the many according to a defined scheme (e.g., selecting a first forwarding table entry that is matched). Forwarding table entries include both a specific set of match criteria (a set of values or wildcards, or an indication of what portions of a packet should be compared to a particular value/values/wildcards, as defined by the matching capabilities—for specific fields in the packet header, or for some other packet content), and a set of one or more actions for the data plane to take on receiving a matching packet. For example, an action may be to push a header onto the packet, for the packet using a particular port, flood the packet, or simply drop the packet. Thus, a forwarding table entry for IPv4/IPv6 packets with a particular transmission control protocol (TCP) destination port could contain an action specifying that these packets should be dropped.

Making forwarding decisions and performing actions occurs, based upon the forwarding table entry identified during packet classification, by executing the set of actions identified in the matched forwarding table entry on the packet.

However, when an unknown packet (for example, a "missed packet" or a "match-miss" as used in OpenFlow parlance) arrives at the data plane 980, the packet (or a subset of the packet header and content) is typically forwarded to the centralized control plane 976. The centralized control plane 976 will then program forwarding table entries into the data plane 980 to accommodate packets belonging to the flow of the unknown packet. Once a specific forwarding table entry has been programmed into the data plane 980 by the centralized control plane 976, the next packet with matching credentials will match that forwarding table entry and take the set of actions associated with that matched entry.

A network interface (NI) may be physical or virtual; and in the context of IP, an interface address is an IP address assigned to a NI, be it a physical NI or virtual NI. A virtual NI may be associated with a physical NI, with another virtual interface, or stand on its own (e.g., a loopback interface, a point-to-point protocol interface). A NI (physical or virtual) may be numbered (a NI with an IP address) or unnumbered (a NI without an IP address). A loopback interface (and its loopback address) is a specific type of virtual NI (and IP address) of a NE/VNE (physical or virtual) often used for management purposes; where such an IP address is referred to as the nodal loopback address. The IP address(es) assigned to the NI(s) of a ND are referred to as IP addresses of that ND; at a more granular level, the IP address(es) assigned to NI(s) assigned to a NE/VNE implemented on a ND can be referred to as IP addresses of that NE/VNE.

Some portions of the preceding detailed descriptions have been presented in terms of algorithms and symbolic representations of transactions on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of transactions leading to a desired result. The transactions are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The algorithms and displays presented herein are not inherently related to any particular computer or other apparatus. Various general-purpose systems may be used with programs in accordance with the teachings herein, or it may prove convenient to construct more specialized apparatus to perform the required method transactions. The required structure for a variety of these systems will appear from the description above. In addition, embodiments are not described with reference to any particular programming language. It will be appreciated that a variety of programming languages may be used to implement the teachings of embodiments as described herein.

An embodiment may be an article of manufacture in which a non-transitory machine-readable (e.g., computer-readable) medium (such as microelectronic memory) has stored thereon instructions (e.g., computer code) which program one or more data processing components (generically referred to here as a "processor") to perform the operations described above. In other embodiments, some of these operations might be performed by specific hardware components that contain hardwired logic (e.g., dedicated digital filter blocks and state machines). Those operations might alternatively be performed by any combination of programmed data processing components and fixed hardwired circuit components.

Throughout the description, embodiments have been presented through flow diagrams. It will be appreciated that the order of transactions and transactions described in these flow diagrams are only intended for illustrative purposes and not intended as being limiting.

In the foregoing specification, embodiments have been described with reference to specific exemplary embodiments thereof. It will be evident that various modifications may be made thereto without departing from the broader spirit and scope of the invention as set forth in the following claims. The specification and drawings are, accordingly, to be regarded in an illustrative sense rather than a restrictive sense.

The invention claimed is:

1. A method implemented by a network device for enabling destination network address translation in a cloud network, the method comprising:

determining that packets having a first public address as a source address and a second public address as a destination address are to be forwarded to a first host that is assigned a first private address, the determining based on receiving a load balancing decision from a load balancer; and sending a first advertisement message to a gateway indicating that packets having the first public address as a source address and the second public address as a destination address are to be forwarded to a first switch connected to the first host, the first switch being configured to:

translate the destination address of those packets from the second public address to the first private address assigned to the first host; and translate, for packets having the first private address assigned to the first host as a source address and the first public address as a destination address, the source address of those packets from the first private address assigned to the first host to the second public address.

2. The method of claim 1, wherein the first advertisement message is a Border Gateway Protocol (BGP) Flow Specification (Flowspec) message.

3. The method of claim 2, wherein the first advertisement message includes a Network Layer Reachability Information (NLRI) field that specifies the first public address as a source address and the second public address as a destination address and a next-hop field that specifies an address assigned to the first switch.

4. The method of claim 1, wherein the first host is a virtual machine and the first switch is a virtual switch connected to the first host.

5. The method of claim 1, wherein the first advertisement message further indicates a source port number and a destination port number for the packets that are to be forwarded to the first switch.

6. The method of claim 1, further comprising:
determining that packets having a third public address as a source address and the second public address as a destination address are to be forwarded to a second host that is assigned a second private address; and
sending a second advertisement message to the gateway indicating that packets having the third public address as a source address and the second public address as a destination address are to be forwarded to a second switch connected to the second host, wherein the second switch is configured to translate the destination address of those packets from the second public address to the second private address assigned to the second host.

7. A method implemented by a network device for enabling source network address translation in a cloud network, the method comprising:
determining that packets having a first public address as a destination address and a first public port as a destination port are to be forwarded to a first host that is assigned a first private address, the determining based on receiving a load balancing decision from a load balancer; and
sending a first advertisement message to a gateway indicating that packets having the first public address as a destination address and the first public port as a destination port are to be forwarded to a first switch connected to the first host, the first switch being configured to:
translate the destination address of those packets from the first public address to the first private address assigned to the first host and to translate the destination port of those packets from the first public port to a first private port; and
translate, for packets having the first private address assigned to the first host as a source address and the first public address as a destination address, the source address of those packets from the first private address assigned to the first host to the second public address.

8. The method of claim 7, wherein the first advertisement message is a Border Gateway Protocol (BGP) Flow Specification (Flowspec) message.

9. The method of claim 8, wherein the first advertisement message includes a Network Layer Reachability Information (NLRI) field that specifies the first public address as a destination address and the first public port as a destination port and a next-hop field that specifies an address assigned to the first switch.

10. The method of claim 7, wherein determining that packets having the first public address as a destination address and the first public port as a destination port are to be forwarded to the first host that is assigned the first private address is based on receiving a message from the first switch.

11. The method of claim 7, wherein the first host is a virtual machine and the first switch is a virtual switch connected to the first host.

12. The method of claim 7, further comprising:
determining that packets having the first public address as a destination address and a second public port as a destination port are to be forwarded to a second host that is assigned a second private address; and
sending a second advertisement message to the gateway indicating that packets having the first public address as a destination address and the second public port as a destination port are to be forwarded to a second switch connected to the second host, wherein the second switch is configured to translate the destination address of those packets from the first public address to the second private address assigned to the second host and to translate the destination port of those packets from the second public port to a second private port.

13. A network device for enabling destination network address translation in a cloud network, the network device comprising:
a set of one or more processors; and
a non-transitory computer-readable storage medium to store instructions, which when executed by the set of one or more processors, causes the network device to:
determine that packets having a first public address as a source address and a second public address as a destination address are to be forwarded to a first host that is assigned a first private address, the determining based on receiving a load balancing decision from a load balancer; and
send an advertisement message to a gateway indicating that packets having the first public address as a source address and the second public address as a destination address are to be forwarded to a first switch connected to the first host, the first switch being configured to:
translate the destination address of those packets from the second public address to the first private address assigned to the first host; and
translate, for packets having the first private address assigned to the first host as a source address and the first public address as a destination address, the source address of those packets from the first private address assigned to the first host to the second public address.

14. The network device of claim 13, wherein the advertisement message is a Border Gateway Protocol (BGP) Flow Specification (Flowspec) message.

15. The network device of claim 14, wherein the advertisement message includes a Network Layer Reachability Information (NLRI) field that specifies the first public address as a source address and the second public address as a destination address and a next-hop field that specifies an address assigned to the first switch.

* * * * *